United States Patent
Erreygers et al.

(10) Patent No.: US 10,075,779 B2
(45) Date of Patent: Sep. 11, 2018

(54) WIRELESS DROP IN A FIBER-TO-THE-HOME NETWORK

(71) Applicants: CommScope Connectivity Belgium BVBA, Kessl-Lo (BE); CommScope Connectivity Spain, S.L., Madrid (ES); CommScope Technologies LLC, Hickory, NC (US)

(72) Inventors: Jan Jozef Julia Maria Erreygers, Tielt-Winge (BE); Jennifer Stephanie Eola Lay, Minneapolis, MN (US); Alfonso Bartolome Munoz, Madrid (ES)

(73) Assignees: CommScope Technologies LLC, Hickory, NC (US); CommScope Connectivity Belgium BVBA, Kessel-Lo (BE); CommScope Connectivity Spain, S.L., Madrid (ES)

( * ) Notice: Subject to any disclaimer, the term of this patent is extended or adjusted under 35 U.S.C. 154(b) by 0 days.

(21) Appl. No.: 14/394,615

(22) PCT Filed: Apr. 19, 2013

(86) PCT No.: PCT/EP2013/058145
§ 371 (c)(1),
(2) Date: Oct. 15, 2014

(87) PCT Pub. No.: WO2013/156585
PCT Pub. Date: Oct. 24, 2013

(65) Prior Publication Data
US 2015/0125146 A1 May 7, 2015

Related U.S. Application Data

(60) Provisional application No. 61/636,395, filed on Apr. 20, 2012.

(51) Int. Cl.
*G06F 15/16* (2006.01)
*G06F 9/455* (2018.01)
(Continued)

(52) U.S. Cl.
CPC ........ *H04Q 11/0067* (2013.01); *H04B 10/25* (2013.01); *H04B 10/25752* (2013.01); *H04J 14/0282* (2013.01); *H04Q 11/0071* (2013.01)

(58) Field of Classification Search
CPC . H04Q 11/0067; H04Q 11/0071; H04B 10/25
(Continued)

(56) References Cited

U.S. PATENT DOCUMENTS 6,895,185 B1 *  5/2005  Chung ................. H04B 10/272
                                                    398/115
7,366,150 B2 *  4/2008  Lee ................. H04B 10/25752
                                                    370/338
(Continued)

FOREIGN PATENT DOCUMENTS

WO   03058850   7/2003
WO   03058984   7/2003
WO   04111707   12/2004

OTHER PUBLICATIONS

Patent Cooperation Treaty, "International Search Report", dated Aug. 15, 2013, pp. 1-4, Published in: WO.

(Continued)

*Primary Examiner* — Oommen Jacob
(74) *Attorney, Agent, or Firm* — Fogg & Powers LLC

(57) ABSTRACT

One embodiment is directed to a wireless drop terminal (WDT) for use in a fiber-to-the-home (FTTH) network. The wireless drop terminal comprises a fiber interface to optically couple the wireless drop terminal to an optical line terminal (OLT) of the FTTH network via at least one optical fiber and a wireless interface communicatively coupled to
(Continued)

the fiber interface. The wireless interface is configured to wirelessly communicate with a wireless optical network terminal (W-ONT) over a fixed directional wireless drop. Other embodiments are disclosed.

26 Claims, 13 Drawing Sheets

(51) Int. Cl.
*H04B 10/00* (2013.01)
*H04W 72/00* (2009.01)
*H04W 72/04* (2009.01)
*H04Q 11/00* (2006.01)
*H04B 10/25* (2013.01)
*H04B 10/2575* (2013.01)
*H04J 14/02* (2006.01)

(58) Field of Classification Search
USPC .................................... 398/58, 43, 79, 96
See application file for complete search history.

(56) References Cited

U.S. PATENT DOCUMENTS

| | | | | |
|---|---|---|---|---|
| 7,480,503 | B2* | 1/2009 | McClure | H04W 84/14 455/422.1 |
| 7,583,896 | B2* | 9/2009 | Taniguchi | H04B 10/25753 398/115 |
| 8,175,459 | B2* | 5/2012 | Thelen | H04B 10/25752 370/352 |
| 9,037,143 | B2* | 5/2015 | Berlin | H04B 10/25758 455/450 |
| 9,219,546 | B2* | 12/2015 | George | H04B 10/25759 |
| 2002/0012495 | A1* | 1/2002 | Sasai | H04B 10/25753 385/24 |
| 2003/0002100 | A1* | 1/2003 | Izadpanah | H04B 10/1149 398/79 |
| 2004/0233877 | A1* | 11/2004 | Lee | H04B 1/7163 370/338 |
| 2008/0063397 | A1* | 3/2008 | Hu | H04J 14/0282 398/43 |
| 2008/0063399 | A1* | 3/2008 | Mallya | H04Q 11/0067 398/75 |
| 2009/0003831 | A1* | 1/2009 | Zheng | H04L 65/1043 398/115 |
| 2009/0042563 | A1* | 2/2009 | Bernard | H04W 36/18 455/432.1 |
| 2010/0040372 | A1* | 2/2010 | Gejbrowitz | H04B 10/25754 398/71 |
| 2010/0150566 | A1* | 6/2010 | Soto | H04B 10/272 398/115 |
| 2010/0254386 | A1* | 10/2010 | Salinger | H04L 12/2801 370/392 |
| 2011/0135308 | A1 | 6/2011 | Tarlazzi et al. | |
| 2011/0268449 | A1 | 11/2011 | Berlin et al. | |
| 2012/0243871 | A1* | 9/2012 | Huang | H04B 10/272 398/58 |
| 2013/0004176 | A1* | 1/2013 | Sato | H04B 10/25754 398/96 |
| 2013/0039276 | A1* | 2/2013 | Tomoe | H04L 12/2834 370/328 |
| 2013/0315593 | A1* | 11/2013 | Lamb | H04Q 11/0067 398/66 |
| 2014/0233951 | A1* | 8/2014 | Cook | H04L 63/02 398/67 |
| 2015/0125146 | A1* | 5/2015 | Erreygers | H04B 10/25 398/58 |
| 2015/0229397 | A1* | 8/2015 | Shibata | H04B 10/25754 398/115 |

OTHER PUBLICATIONS

Chowdhury et al., "Hybrid Wireless-Optical Broadband Access Network (WOBAN): Prototype Development and Research Challenges", May 1, 2009, pp. 41-48, Publisher: IEEE Network, Published in: US.

Chowdhury et al., "Multi-Service Multi-Carrier Broadband MIMO Distributed Antenna Systems for In-Building Optical Wireless Access", Mar. 21, 2010, pp. 1-3, Publisher: IEEE Network, Published in: US.

* cited by examiner

WIRELESS DROP IN A FIBER-TO-THE-HOME NETWORK

CROSS-REFERENCE TO RELATED APPLICATION

This application claims priority to International Patent Application No. PCT/EP2013/058145 filed on Apr. 20, 2013, which claims priority to U.S. Provisional Application No. 61/636,395 filed on Apr. 20, 2012, all of which are hereby incorporated by reference.

BACKGROUND

Fiber-to-the-home (FTTH) network architectures are a class of broadband network architectures in which optical fiber is used as the communication media all the way to each customer's home. By using optical fiber as the communication media all the way to each customer's home, FTTH networks can be used to provide such home customers with broadband bandwidth levels associated with fiber optic communication.

The fiber optic cable that terminates at each customer's home is referred to here as the "fiber drop." Installation of each fiber drop typically requires physical access to the customer's home and surrounding area in order to dig up the customer's yard and/or surrounding area for burying the fiber drop cable. Physical access to the customer's home is also required to terminate the fiber drop at the customer's home. As a consequence, installing fiber drops, can account for up to thirty percent of the capital expense of deploying a FTTH network and can delay the deployment of a FTTH network.

Third generation (3G) or fourth generation (4G) cellular network technology can be used to provide broadband bandwidth to customer end nodes in a wireless manner. However, the majority of customer end nodes in cellular networks are mobile. As a result, cellular networks (including 3G or 4G cellular networks) are designed to support the mobility of the customer end nodes, which can reduce the amount of broadband bandwidth that can be provided using such 3G or 4G technology. Moreover, typically cellular networks use omni-directional antennas or large angle (90° and 120°) sector antennas and point-to-multipoint wireless communication links, which may need increased power levels and reduce the amount of frequency reuse that can be achieved.

Within a customer's premises, it is common to implement a wireless local area network using wireless communication technology that implements one or more of the Institute of Electrical and Electronics Engineers (IEEE) 802.11 family of wireless standards. That is, such wireless communication technology is implemented on the customer side of the demarcation point that separates the telecommunication service provider's equipment and the customer's equipment (also referred to as "customer premises equipment" or "CPE"). Moreover, such wireless local area networks (WLANs) are implemented using unlicensed radio frequency spectrum.

SUMMARY

One embodiment is directed to a wireless drop terminal for use in a fiber-to-the-home (FTTH) network. The wireless drop terminal comprises a fiber interface to optically couple the wireless drop terminal to an optical line terminal of the FTTH network via at least one optical fiber and a wireless interface communicatively coupled to the fiber interface. The wireless interface is configured to wirelessly communicate with a wireless optical network terminal (W-ONT) over a fixed directional wireless drop.

Another embodiment is directed to a wireless optical network terminal (W-ONT) for use in a fiber-to-the-home (FTTH) network. The W-ONT comprises a wireless interface and at least one service interface to implement a service provided to a customer of the FTTH network. The wireless interface is configured to wirelessly communicate with a wireless drop terminal included in the FTTH network over a fixed directional wireless drop.

Another embodiment is directed to a fiber-to-the-home (FTTH) network comprises an optical line terminal (OLT) to couple the FTTH network to a core network, a wireless drop terminal that is optically coupled to the OLT via at least one optical fiber, and a wireless optical network terminal (W-ONT) to provide a service to customer premises equipment. The wireless drop terminal and the W-ONT are configured to wirelessly communicate with one another over a fixed directional wireless drop using the first and the second antennas.

Other embodiments are disclosed.

DRAWINGS

DETAILED DESCRIPTION

Figure 1:
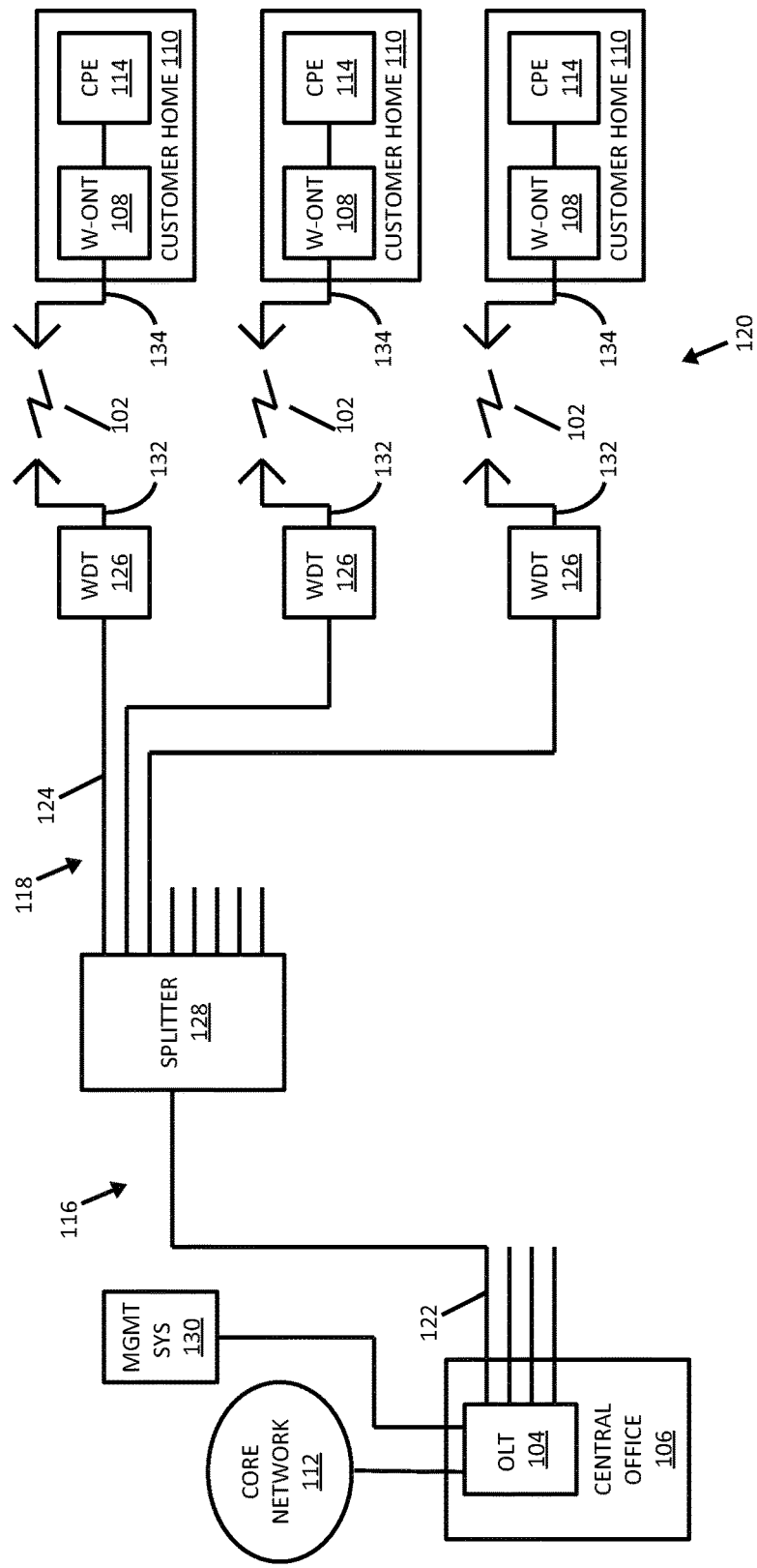
FIG. 1 is a block diagram of one example of a fiber-to-the-home (FTTH) network that makes use of wireless drops.

FIG. 1 is a block diagram of one example of a fiber-to-the-home (FTTH) network 100 that makes use of wireless drops 102.

In the example shown in FIG. 1, the FTTH network 100 is configured to communicatively couple an optical line terminal (OLT) 104 located in the central office (or other point of presence) 106 of a telecommunication service provider to a respective wireless optical network terminal (W-ONT) 108 (also referred to as a wireless optical network unit (W-ONU)) 108 located at each customer's home 110.

Each OLT 104 serves as an interface and multiplexer between the service provider's core network 112 and the FTTH network 100. The service provider's core network 112 can, for example, include or be communicatively coupled to the Internet (not shown), a public switched telephone network (PSTN) (not shown), and/or a video network (not shown). The service provider's core network 112 can include other networks.

Each W-ONT 108 terminates the wireless drop 102 and presents the service interfaces to the customer's equipment (CPE) 114. That is, in this embodiment, each W-ONT 108 is a part of the telecommunication service provider's network and defines the demarcation point between the telecommunication service provider's network and equipment and the customer premise equipment. The services provided via the service interfaces of each W-ONT 108 can include telephony (for example, plain old telephone service (POTS) or voice over IP (VOIP)), data (for example, ETHERNET or V.35), wireless local area network (for example, one or more of the Institute of Electrical and Electronics Engineers (IEEE) 802.11 family of standards, including IEEE 802.11 a/b/g/n/ac) service, and/or video. One example of a W-ONT 108 suitable for use with the FTTH network 100 is described below in connection with FIG. 3.

The example FTTH network 100 shown in FIG. 1 is described here as being implemented as a point-to-multipoint passive optical network, though it is to be understood that the wireless drops 102 described here can also be used in other types of FTTH networks (for example, active optical FTTH networks or other types of passive optical FTTH networks).

In the example shown in FIG. 1, the FTTH network 100 includes a feeder section 116 (also referred to here as the "F1 section 116"), a distribution section 118 (also referred to here as the "F2 section 118") and a drop section 120 (also referred to here as the "F3 section 120"). The F1 section 116 of the FTTH network 100 is closest to the central office 106, the F3 section 120 is closest to the customers' homes 110, and the F2 section 118 couples the F1 section 116 and the F3 section 120 to one another.

Feeder optical fibers 122 (also referred to here as "F1 fibers 122") are used in the F1 section 116, and distribution optical fibers 124 (also referred to here as "F2 fibers 124") are used in the F2 section 118. Unlike with conventional FTTH networks, wireless drops 102 are used in the F3 section 120 of the network 100.

Optical signals are communicated between the OLTs 104 in the central office 106 and wireless drop terminals (WDT) 126 in the F3 section 120. In the example shown in FIG. 1, each optical signal transmitted from an OLT 104 to a wireless drop terminal 126 travels from the OLT 104 to a respective passive optical splitter 128 (for example, a 1-to-8 passive optical splitter, a 1-to-16 passive optical splitter, or a 1-to-32 passive optical splitter). Each passive optical splitter 128 "splits" the incoming F1 fiber 122 into a number of F2 fibers 124.

In this example, payload data for the various services provided to the customer are combined together and used to generate frames of data suitable for communication over the fiber part of the FTTH network 100. These frames are also referred to here as "optical frames". Suitable optical protocols and technology can be used for formatting the optical frames and communicating the frames over the FTTH network 100 to the wireless drop terminals 126 (such as Gigabit-capable Passive Optical Network (GPON) protocols and technology as described ITU-T G.984 series Recommendations, Ten-Gigabit-capable Passive Optical Network (XGPON) protocols and technology as described in ITU-T G.987 series Recommendations, and/or GIGABIT ETHERNET protocols and technology).

Moreover, in the example shown in FIG. 1, multiple optical wavelengths are multiplexed together for communication in both the downstream and upstream directions using wavelength division multiplexing. Other types of multiplexing can also be used (instead of or in addition to wavelength division multiplexing). As used here, the "downstream" direction refers to the direction from the OLTs 104 to the customers' homes 110, and the "upstream" direction refers to the direction from the customers' homes 110 to the OLTs 104.

In the example shown in FIG. 1, in the downstream direction, each passive optical splitter 128 outputs each of the multiple downstream optical signals received on the corresponding F1 fiber 122 onto one of the F2 fibers 124. In this example, in the upstream direction, each passive optical splitter 128 outputs each of the optical signals received on the various F2 fibers 124 out onto the corresponding F1 fiber 122.

The passive optical splitters 128 can be deployed in various ways. For example, the passive optical splitters 128 can be deployed in fiber distribution hubs (FDH) that are configured for convenient patching or splicing of the fibers 122 and 124 to the passive optical splitters 128. The passive optical splitters 128 can be deployed in other ways.

In the example shown in FIG. 1, each F2 fiber 124 is terminated at the other end at a respective wireless drop terminal 126.

The F1 fibers 122 can be deployed using main or trunk cables that bundle together multiple F1 fibers 122 and branch cables that branch one or more individual F1 fibers 122 off from the F1 main or trunk cables at various break out locations in the F1 section 116 of the network 100 (for example, to couple individual F1 fibers 122 to passive optical splitters 128). Likewise, the F2 fibers 124 can be deployed using main or trunk cables that bundle together multiple F2 fibers 124 and branch cables that branch one or more individual F2 fibers 124 off from the F2 main or trunk cables at various break out locations in the F2 section 118 of the network 100 (for example, to couple individual F2 fibers to passive optical splitters 128 or to the wireless drop terminals 126). The F1 fibers 122 and F2 fibers 124 can be deployed in other ways.

As noted above, unlike with conventional FTTH networks, the FTTH network 100 shown in FIG. 1 uses a wireless drop 102 to a provide a wireless communication link between the W-ONT 108 in each customer's home 110 and one of the wireless drop terminals 126.

In this example, the optical frames communicated over the fiber parts of the FTTH network 100 are encapsulated in frames of data suitable for communication over the wireless drops 102. These frames are also referred to here as "wireless frames". Each wireless drop terminal 126 and W-ONT 108 handles the encapsulation of optical frames into wireless frames and the extraction of optical frames over the wireless frames.

It should be noted that encapsulating the optical frames in wireless frames is only one example of how the payload service data included in the optical frames can be communicated in wireless frames over the wireless drops 102. One of skill in the art will recognize that this can be done in other ways. For example, the payload service data included in each optical frame can be extracted from the optical frame, and only the extracted payload service data (not the entire original optical frame) can be inserted into a wireless frame and communicated over the wireless drop 102. At the receiving end, the payload service data can be extracted from the received wireless frame, and the extracted payload service data can be inserted into a newly generated optical frame that is used at the end of the wireless drop 102 or used to provide the relevant services.

Each wireless drop 102 is implemented as a fixed directional wireless link between the W-ONT 108 and the wireless drop terminal 126 using high-bandwidth wireless technology. Each such wireless drop 102 is also referred to here as a "fixed directional wireless drop" 102. As used herein, a fixed directional wireless link refers to a wireless link that is implemented between two fixed (that is, non-mobile) nodes, where the wireless interface and/or antenna used be at least one of the nodes is configured to function more effectively in one direction than it does in others directions. In this case, the nodes for the fixed directional wireless drop are the wireless drop terminal 126 and the W-ONT 108, which are non-mobile (fixed) nodes. Also, in this case, at least one of the wireless drop terminal 126 and the W-ONT 108 (or the antennas used therewith) are configured to more effectively function in the direction between the wireless drop terminal 126 and the W-ONT 108.

As shown in FIG. 1, each wireless drop terminal 126 can be configured to communicate on a point-to-point basis with each W-ONT 108 it services. That is, for each W-ONT 108 it services, the wireless drop terminal 126 includes a separate wireless interface and separate directional antenna 132 that are dedicated for communicating with that W-ONT 108 over a respective wireless drop 102. Likewise, each such W-ONT 108 also includes a wireless interface and a directional antenna 134 that are used for wirelessly communicating with that wireless drop terminal 126. In other words, in this example, for each wireless drop 102, both the corresponding wireless drop terminal 126 and W-ONT 108 are configured to communicate more effectively in the direction between those two nodes.

It is to be understood, however, that fixed directional wireless drops 102 can be implemented in other ways.

Each wireless drop terminal 126 can be configured to communicate on a point-to-multipoint basis with each W-ONT 108 it services using a fixed directional wireless drop. That is, each wireless drop terminal 126 services two or more W-ONTs 108 using the same wireless interface and same antenna. In such an example, at least the W-ONT is configured to communicate more effectively in the direction between that W-ONT and the wireless drop terminal. One such example is described below in connection with FIG. 8.

Also, each wireless drop terminal and/or each W-ONT can include multiple antennas for communicating over the corresponding fixed directional wireless drop. For example, both the wireless drop terminal and W-ONT can use multiple antennas to communicate over the corresponding fixed directional wireless drop using Multiple-Input, Multiple Output (MIMO) wireless communication technology (for example, one of the WiMAX or other IEEE 802.16 standards that use MIMO technology or one of the WiFi or other IEEE 802.11 standards (such as the IEEE 802.11n, IEEE 802.11ac, or IEEE 802.11ad standards)). One such example is described below in connection with FIGS. 9-11.

Also, beam forming techniques can be used. For example, beam forming techniques can be used in a MIMO configuration (such as is described below in connection with FIGS. 9-11). Also, beam forming can be used in other configurations where the wireless drop terminal includes multiple antennas or antenna elements and each W-ONT it communicates with includes a single antenna to communicate with the wireless drop terminal, where the wireless drop terminal uses beam forming to communicate with each such W-ONT. One such example is described below in connection with FIGS. 12-14. Likewise, beam forming can be used in other configurations where the W-ONT includes multiple antennas or antenna elements and the wireless drop terminal it communicates with includes a single antenna to communicate with the W-ONT, where the W-ONT uses beam forming to communicate with the wireless drop terminal.

Each wireless communication link can be implemented using wireless transceivers that implement one or more third generation (3G) or fourth generation (4G) cellular protocols such as the High Speed Packet Access (HSPA), Evolved HSPA (HSPA+), Long Term Evolution (LTE), and LTE Advanced (LTEadvanced) cellular protocols. Although 3G and 4G cellular protocols have typically been used for multi-directional broadcast, mobile wireless communications, such cellular protocols and related technology are used in the network 100, instead, to implement fixed, directional wireless links (and, in some embodiments, point-to-point links). Each wireless drop 102 can also be implemented using other high-bandwidth wireless technology such as WIMAX (or other IEEE 802.16) wireless metropolitan area network technology, one of the IEEE 802.11 family (for example, IEEE 802.11 a/b/g/n/ac/ad) of wireless local area network technologies, as well as wireless technology that make use of WirelessHD, Wireless Home Digital Interface (WHDI), ultra wideband (UWB), visible light communication, and proprietary point-to-point technology, standards, and protocols.

In some implementations, licensed radio frequency spectrum is used (for example, licensed radio frequency spectrum used for either cellular (or other mobile) networks or fixed networks). In other implementations, unlicensed radio frequency spectrum is used. Also, MIMO technology and beam forming can be used (for example, as implemented in one or more of the WIMAX or other IEEE 802.16 standards or one of the IEEE 802.11 family of wireless local area network standards).

The wireless drop terminal 126 can be configured to control the amount of bandwidth provided to the customer over the wireless drop 102. This can be used by the service provider to charge different rates for different amounts of bandwidth, which can improve the service provider's profits and/or provide customers with more tailored service offerings.

In the exemplary embodiment shown in FIG. 1, each wireless drop terminal 126 includes at least one separate directional antenna 132 for each W-ONT 108 that the wireless drop terminal 126 communicates with. Also, each W-ONT 108 includes or is connected to at least one directional antenna 134. Because each wireless drop 102 is implemented as a fixed, point-to-point wireless link, directional antennas can be used to improve the reliability of the wireless communication link, lower transmission power, and/or promote geographical spectral reuse efficiency.

Each W-ONT 108 wirelessly sends and receives payload data for the various services provided to the customer using the wireless drop 102. In the downstream direction, each W-ONT 108 extracts the payload data for each of the services provided to the customer and presents that data to the customer premise equipment 114 on one or more service interfaces suitable for that service. In the upstream direction, each W-ONT 108 receives payload data for the services provided to the customer and multiplexes the data together for communication over the wireless drop 102 and FTTH network 100 to the service provider's core network 112.

In the example shown in FIG. 1, the WDTs 126 and W-ONTs 108 are managed by a management system 130. In this example, the management system 130 is coupled to the OLT 104 and sends and receives management data to and from the WDTs 126 and W-ONTs 108 using the FTTH network 100 (for example, using the Simple Network Management Protocol (SNMP)). The management system 130 that is used to manage the WDTs 126 and W-ONTs 108 can be the same management system that is used to manage other elements in the FTTH network 100 or can be separate from the management system that is used to manage other elements in the FTTH network 100. The WDTs 126 and W-ONTs 108 can be managed in other ways. For example, the same management system 130 need not be used to manage both the WDTs 126 and the W-ONTs 108; instead, separate management systems can be used. Also, other management protocols can be used.

By using a wireless drop 102 to a provide a communication link between the W-ONT 108 in each customer's home 110 and one of the wireless drop terminals 126, the cost and delay that may arise with installing a fiber drop to provide connectivity to the customer's home may be avoided.

The use of wireless drops 102 can be used as a temporary measure as a part of a larger FTTH roll-out program. For example, where there are not sufficient customers using FTTH service in a given neighborhood to make it economical to deploy a crew to install fiber drops in that neighborhood, wireless drops 102 can be used until there are sufficient customers. When there are sufficient customers, the wireless drop terminals 126 and W-ONTs 108 can be replaced with conventional passive optical network fiber drop terminals and optical node terminals and a crew can be deployed to install fiber drops between them.

Also, the use of wireless drops 102 can be used as a more permanent measure. For example, where a state, city, or other municipality or regulator agency does not permit the telecommunication service provider to install fiber drops to certain customer homes, wireless drops 102 can be used on a permanent basis to provide the drop to the customer homes. Furthermore, the use of wireless drops 102 can be used where customers do not wish for fiber to be installed on their premises.

Moreover, in the exemplary embodiment shown in FIG. 1, wireless drops 102 are used to provide service to all customer homes 110. It is to be understood that this need not be the case. That is, in some embodiments, conventional fiber drops can be used to provide service to some customer homes while wireless drops can be used to provide service to other customer homes. It is also possible to provide service to a customer home using both a fiber drop and a wireless drop.

Figure 2:
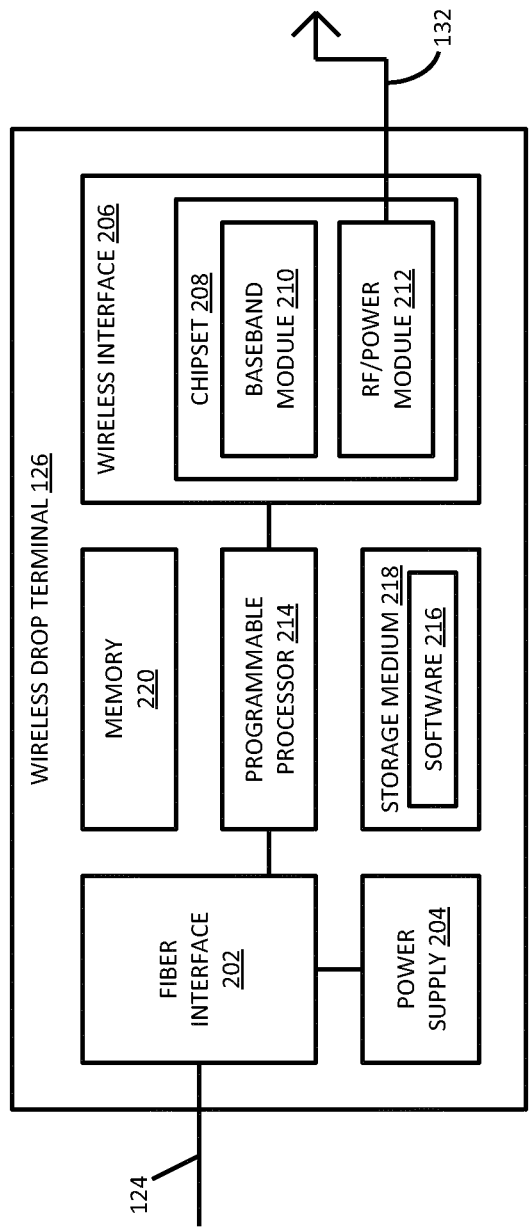
FIG. 2 is a block diagram of one example of a wireless drop terminal suitable for use in the FTTH network shown in FIG. 1.

FIG. 2 is a block diagram of one example of a wireless drop terminal 126 suitable for use in the FTTH network 100 shown in FIG. 1. Although the example wireless drop terminal 126 shown in FIG. 2 is described here as being implemented for use in the FTTH network 100 of FIG. 1, it is to be understood that the wireless drop terminal 126 can be implemented for use with other types of FTTH networks and the FTTH network 100 shown in FIG. 1 can be implemented using other types of wireless drop terminals 126.

In the example shown in FIG. 2, the wireless drop terminal 126 includes a fiber interface 202. The fiber interface 202 provides a mechanical interface to connect an F2 fiber 124 to the wireless drop terminal 126. The fiber interface 202 also implements a fiber optic transceiver that is configured to send and receive data over the F2 fiber 124. The fiber interface 202 can also implement other protocols or functions. A suitable optical physical layer protocol or technology can be used for communicating data over the FTTH network 100 to the wireless drop terminal 126 (such as GPON, XGPON, and/or GIGABIT ETHERNET protocols and technology).

In the example shown in FIG. 2, both management data and service data are communicated over the F2 fiber 124 (and the FTTH network 100 more generally) in optical frames.

In the example shown in FIG. 2, the F2 fiber 124 that is connected to the wireless drop terminal 126 is implemented using a hybrid cable that includes, in addition to an optical fiber, a pair of copper conductors or other electrically conducting element such as, for example, foils. The pair of copper conductors is used to supply power and return to the wireless drop terminal 126. In this example, the fiber interface 202 is configured to couple the power and return signals to a power supply 204 included in the wireless drop terminal 126. The power supply 204 is configured to provide power and return to the active components in the wireless drop terminal 126 based on the power and return signals provided on the hybrid cable. In this example, power and return are injected on the hybrid cable at FDH in which the passive optical network splitter 128 is housed. It is to be understood, however, that the wireless drop terminal 126 can be powered in other ways (for example, by providing a connection the mains alternating current (AC) power grid, by using a battery, by running a separate power cable from a fiber distribution hub, by providing power from a lamp or utility pole on which the wireless-drop terminal 126 is installed, and/or by using solar power).

The wireless drop terminal 126 also comprises a wireless interface 206. In the exemplary embodiment shown in FIG. 2, the wireless interface 206 is implemented using a chipset 208 that implements the various wireless protocols that are used.

In one exemplary implementation of the example shown in FIG. 2, the chipset comprises a 3G or 4G femtocell cellular base station physical layer chipset that implements one or more 3G or 4G cellular physical layer protocols. In another exemplary implementation of the example shown in FIG. 2, the wireless interface 206 is implemented using a wireless local area network or wireless metropolitan area network access point chipset that implements one or more WiMAX or other IEEE 802.16 standards or one or more WiFi or other IEEE 802.11 standards.

In this example, the chipset 208 includes a baseband module 210 that implements the baseband processing necessary to implement the particular protocols that are used. In this example, the baseband module 210 implements both transmit and receive baseband processing. In the downstream direction, the baseband module 210 receives downstream wireless frames to be transmitted to the W-ONT 108. The baseband module 210 generates the digital baseband data necessary to produce a radio frequency (RF) waveform in accordance with the particular physical layer protocols used that encodes the downstream wireless frames. In this example, this digital baseband data comprises an in-phase (I) component and a quadrature-phase (Q) component.

In the upstream direction, the baseband module 210 receives digital baseband data that has been generated from an RF waveform transmitted from the W-ONT 108 to the wireless drop terminal 126. The baseband module 210 processes the received digital baseband data to extract upstream wireless frames.

The baseband module 210 can be implemented by programming a digital signal processor (DSP) to implement the baseband processing.

In the example shown in FIG. 2, the chipset 208 also includes a RF/power module 212. In the downstream direction, the RF/power module 212 receives transmit digital baseband data from the baseband module 210. The RF/power module 212 converts the in-phase and quadrature components of the transmit digital baseband data to respective analog in-phase and quadrature baseband signals. The RF/power module 212 also mixes the analog in-phase and quadrature baseband signals with appropriate quadrature mixing signals to produce the desired transmit analog RF signal. The RF/power module 212 bandpass filters the transmit analog RF signal and amplifies it prior to being radiated from directional antenna 132 connected to the wireless drop terminal 126.

In the upstream direction, the RF/power module 212 receives an analog RF signal from the directional antenna 132 connected to the wireless drop terminal 126. The RF/power module 212 mixes the received analog RF signal with appropriate quadrature mixing signals in order to produce analog baseband in-phase and quadrature signals. The RF/power module 212 bandpass filters the analog baseband in-phase and quadrature signals. The RF/power module 212 then converts the filtered analog baseband in-phase and quadrature signals to digital in-phase and quadrature baseband data, respectively. This received digital in-phase and quadrature baseband data is provided to the baseband module 210 for baseband processing as described above.

The chipset 208 can also include other functionality (for example, media access control (MAC) functionality) (not shown).

In the example shown in FIG. 2, the wireless drop terminal 126 further comprises one or more programmable processors 214 for executing software 216. The software 216 comprises program instructions that are stored (or otherwise embodied) on or in an appropriate non-transitory storage medium or media 218 (such as flash or other non-volatile memory, magnetic disc drives, and/or optical disc drives) from which at least a portion of the program instructions are read by the programmable processor 214 for execution thereby. Although the storage media 218 is shown in FIG. 2 as being included in, and local to, the respective wireless drop terminal 126, it is to be understood that remote storage media (for example, storage media that is accessible over the network 100) and/or removable media can also be used. Each wireless drop terminal 126 also includes memory 220 for storing the program instructions (and any related data) during execution by the programmable processor 214. Memory 220 comprises, in one implementation, any suitable form of random access memory (RAM) now known or later developed, such as dynamic random access memory (DRAM). In other embodiments, other types of memory are used.

In the example shown in FIG. 2, the software 216 in the wireless drop terminal 126 implements the management functions supported by the wireless drop terminal 126. The software 216 sends and receives management data with the management system 130 over the F2 fiber 124. For example, the management system 130 and the software 216 can be configured to control the amount of bandwidth that is provided to the customer using the wireless drop 102. The software 216 interacts with the wireless interface 206 (and the chipset 208 used to implement it) in order to do this. In this way, the service provider is able to offer various tiers of bandwidth to the customer at different rates, which can improve the service provider's profits and/or provide customers with more tailored service offerings.

Moreover, the software 216 in the wireless drop terminal 126 encapsulates the downstream optical frames received on the fiber interface 202 from the F2 fiber 124. The software 216 encapsulates the downstream optical frames in downstream wireless frames and forwards the downstream wireless frames to the wireless interface 206 for wireless transmission to the corresponding W-ONT 108 over the wireless drop 102. The software 216 also extracts upstream optical frames from the upstream wireless frames received on the wireless interface 206 from the wireless drop 102. The software 216 forwards the upstream optical frames to the fiber interface 202 for transmission out on the F2 fiber 124.

The example shown in FIG. 2 can be implemented using a commercially available femtocell cellular base station or wireless local area networking physical layer chipset 208. Such chipsets 208 typically are designed and manufactured for sale at relatively low price points, which enables the wireless drop terminal 126 to implement a high-bandwidth wireless drop 102 for a relatively low price. Moreover, such chipsets 208 are typically implemented for use at relatively low transmission power levels, which reduces the amount of electrical power that is required to power the wireless drop terminal 126. Moreover, the use of directional antennas 132 should improve the transmission performance of such low-power chipsets and/or reduce the required transmission power.

Figure 3:
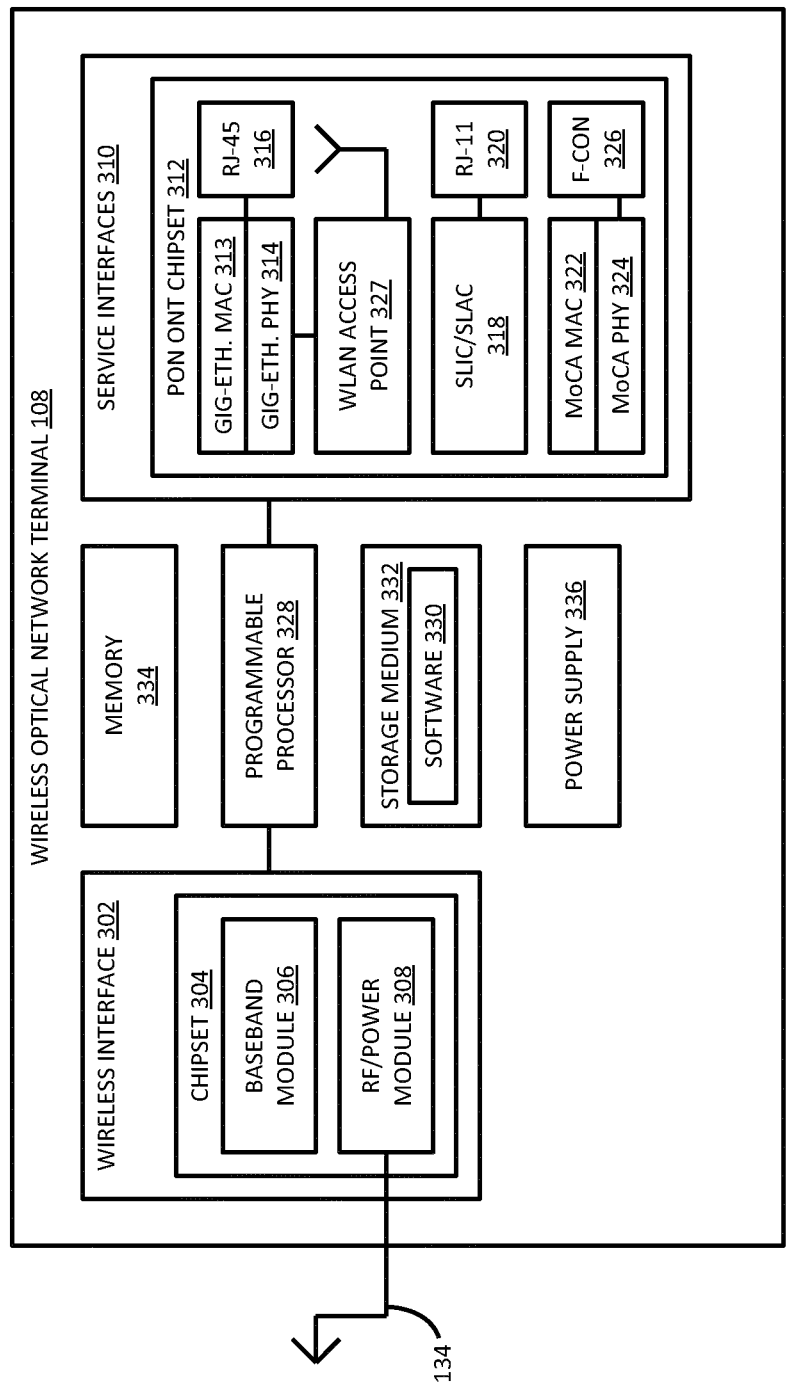
FIG. 3 is a block diagram of one example of a wireless optical network terminal (W-ONT) suitable for use in the FTTH network shown in FIG. 1.

FIG. 3 is a block diagram of one example of a wireless optical network terminal (W-ONT) 108 suitable for use in the FTTH network 100 shown in FIG. 1. Although the example W-ONT 108 shown in FIG. 3 is described here as being implemented for use in the FTTH network 100 of FIG. 1, it is to be understood that the W-ONT 108 can be implemented for use with other types of wireless drop terminals and FTTH networks and the FTTH network 100 shown in FIG. 1 can be implemented using other types of W-ONTs 108.

In the example shown in FIG. 3, the W-ONT 108 comprises a wireless interface 302 that is compatible with the wireless interface 206 used in the wireless drop terminal 126. The wireless interface 302 is coupled to the directional antenna 134 that is connected to the W-ONT 128.

In this example, the chipset 304 includes a baseband module 306 and an RF/power module 308 that implement similar functionality as is implemented by the baseband module 210 and the RF/power module 212, respectfully, in the wireless drop terminal 126.

In one exemplary implementation of the example shown in FIG. 3, the wireless interface 302 is implemented using a 3G or 4G cellular mobile unit physical layer chipset that implements one or more 3G or 4G cellular physical layer protocols. In another exemplary implementation of the example shown in FIG. 2, the wireless interface 302 is implemented using a wireless local area network or wireless metropolitan area network end device physical layer chipset that implements one or more WiMAX or other IEEE 802.16 standards or one or more WiFi or other IEEE 802.11 standards physical layer protocols.

The chipset 304 can also include other functionality (for example, media access control (MAC) functionality) (not shown).

The W-ONT 108 also comprises one or more service interfaces 310 that implement service interfaces for the particular services provided to the customer. In the example shown in FIG. 3, the service interfaces 310 are implemented using a conventional PON ONT chipset 312. In this example, the optical transceiver that would typically be included in a conventional PON ONT chipset 312 is not used. The PON ONT chipset 312 implements the service interface protocols that are implemented by the W-ONT 108. For example, in the example shown in FIG. 3, the PON chipset 312 includes a GIGABIT ETHERNET media access control (MAC) device 313 and physical layer device 314 and one or more RJ-45 jacks 316 for providing GIGABIT ETHERNET service to the customer (which can be used for Internet service, VOIP telephony service, IP video service, etc.).

Also, in this example, the PON chipset 312 includes a subscriber line interface circuit (SLIC)/subscriber line audio processing circuit (SLAC) device 318 and one or more RJ-11 jacks 320 for providing POTS telephony service to the customer. In this example, the PON chipset 312 further includes a Multimedia over Coax Alliance (MoCA) MAC device 322, a MoCA physical layer device 324, and one or more F connectors 326 for providing video service to the customer.

In the example shown in FIG. 3, the PON chipset 312 also includes a wireless local area network access point 327 (for example, one or more of the IEEE 802.11 family of standards) that provides wireless local area network service in the customer's home 110.

In the example shown in FIG. 3, the W-ONT 108 further comprises one or more programmable processors 328 for executing software 330. The software 330 comprises program instructions that are stored (or otherwise embodied) on or in an appropriate non-transitory storage medium or media 332 (such as flash or other non-volatile memory, magnetic disc drives, and/or optical disc drives) from which at least a portion of the program instructions are read by the programmable processor 328 for execution thereby. Although the storage media 332 is shown in FIG. 3 as being included in, and local to, the W-ONT 108, it is to be understood that remote storage media (for example, storage media that is accessible over the network 100 or the Internet) and/or removable media can also be used. Each W-ONT 108 also includes memory 334 for storing the program instructions (and any related data) during execution by the programmable processor 328. Memory 334 comprises, in one implementation, any suitable form of random access memory (RAM) now known or later developed, such as dynamic random access memory (DRAM). In other embodiments, other types of memory are used.

In the example shown in FIG. 3, the software 330 in the W-ONT 108 implements the management functions supported by the W-ONT 108. The software 330 sends and receives management data with the management system 130 over the wireless drop 102. For example, the management system 130 and the software 330 can be configured to control the amount bandwidth that is provided to the customer using the wireless drop 102. The software 330 interacts with the wireless interface 302 (and the chipset 304 used to implement it) in order to do this.

Moreover, the software 330 in the W-ONT 108 extracts downstream optical frames from the upstream wireless frames received on the wireless interface 302 from the wireless drop 102. The software 330 also extracts downstream service data for each of the service interfaces 310 implemented by the W-ONT 108 and provides the downstream service data to the appropriates parts of the PON ONT chipset 312 that implement that service.

Furthermore, the software 330 receives upstream service data from each of the service interfaces 310 implemented by the W-ONT 108. The upstream service data is received from the appropriate parts of the PON ONT chipset 312 that implement each service interface 310. The software 330 combines the upstream service data and generates upstream optical frames that include the combined upstream service data. The upstream optical frames are generated in a format suitable for transmission on the fiber part of the FTTH network 100. The software 330 encapsulates these upstream optical frames in upstream wireless frames and forwards the upstream wireless frames to the wireless interface 302 for wireless transmission to the corresponding wireless drop terminal 126 over the wireless drop 102.

In this example, the W-ONT 108 comprises a power supply 336 for supplying power to the active components of the W-ONT 108. Input power is supplied to the power supply 336 via a connection to the mains alternating current (AC) power grid. Power can be supplied to the power supply 336 in other ways (for example, using a battery and/or a solar cell).

Figure 4:
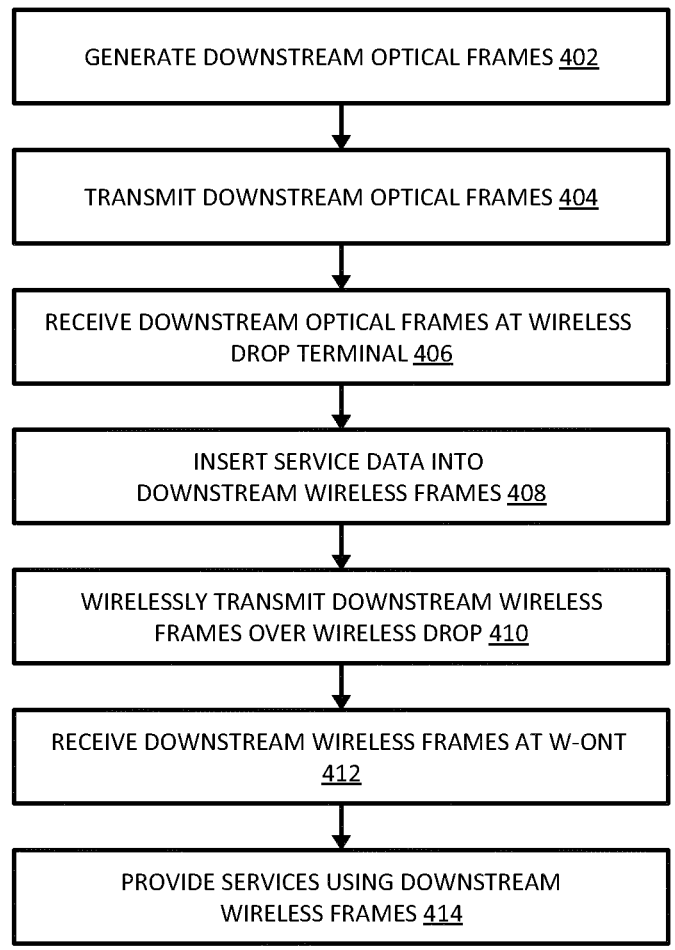
FIG. 4 is a flow diagram of one example of a method of communicating data from an OLT to a customer home using the FTTH network shown in FIG. 1.

FIG. 4 is a flow diagram of one example of a method 400 of communicating data from the OLT 104 to a customer home 110 using the FTTH network 100 shown in FIG. 1. Although the example method 400 shown in FIG. 4 is described here as being implemented in the FTTH network 100 of FIG. 1, it is to be understood that the method 400 can be implemented for use with other types of FTTH networks, and the FTTH network 100 shown in FIG. 1 can be used to communicate data in other ways.

Method 400 comprises generating downstream optical frames for providing at least one telecommunication service to a customer's home 110 (block 402). In this example, this is done as follows. Downstream management data and service data to be communicated to the W-ONT 108 at a particular customer's home 110 are received at the appropriate OLT 104 from the service provider's management system 130 and core network 112, respectively. The OLT 104 combines the downstream management and service data and generates downstream optical frames that include the management and service data. The downstream optical frames are generated in a format suitable for communication over the fiber part of the FTTH network 100.

Method 400 further comprises transmitting the downstream optical frames from the OLT 104 to the relevant wireless drop terminal 126 using the fiber part of the FTTH network 100 (block 404). In this example, this is done as follows. The OLT 104 optically transmits the downstream optical frames on an appropriate F1 fiber 122 using the particular optical physical layer protocol and technology implemented in the FTTH network 100 (for example, GPON, XGPON, and/or GIGABIT ETHERNET protocols and technology). In this example, a separate downstream optical signal is transmitted for each wireless drop terminal 126 and W-ONT 108, each of which is transmitted using a different optical wavelength. In this example, where the FTTH network 100 is implemented as a point-to-multipoint PON, the various downstream optical signals are multiplexed together for communication in the downstream directions using wavelength division multiplexing.

The downstream optical signal travels from the OLT 104 on the respective F1 fiber 122 through the F1 section 116 of the FTTH network 100. As noted above, the F1 fiber 122 over which the downstream optical signal travels is typically implemented using multiple different segments of optical fiber that are optically connected to one another. For example, as noted above, the F1 fibers 122 can be implemented using trunk cables and branch cables.

In this example, the downstream optical signal travels from the OLT 104 to a passive optical network splitter 128. At the passive optical splitter 128, the downstream optical signal is received from the F1 fiber 122 connected to that splitter 128 and output onto one of the F2 fibers 124 connected to that splitter 128. In this example, the optical downstream signal then travels from the passive optical splitter 128 to the wireless drop terminal 126.

Method 400 further comprises receiving the downstream optical frames at the wireless drop terminal 126 from the fiber part of the FTTH network 100 (block 406). In this example, the fiber interface 202 in the wireless drop terminal 126 extracts the downstream optical frames from the downstream optical signal received at the wireless drop terminal 126.

Method 400 further comprises inserting the downstream service data from the downstream optical frames into downstream wireless frames (block 408). In this example, this is done as follows. The software 216 in the wireless drop terminal 126 processes any management data addressed to it included in the downstream optical frames. The software 216 also encapsulates the downstream optical frames (which include the downstream service data) in downstream wireless frames. The downstream wireless frames are generated in a format suitable for wireless transmission over the wireless drop 102. As noted above, the service data can be inserted into wireless frames in other ways.

Method 400 further comprises wirelessly transmitting the downstream wireless frames from the wireless drop terminal to the W-ONT 108 using the directional antenna 132 and the fixed, point-to-point wireless drop 102 (block 410). In this example, this is done as follows. The software 216 in the wireless drop terminal 126 provides the downstream wireless frames to the wireless interface 206. The wireless interface 206 uses the femtocell cellular base station physical layer chipset 208 to produce a downstream RF signal from the downstream wireless frames. The downstream RF signal is radiated from the directional antenna 132 attached to the wireless drop terminal 126.

Method 400 further comprises receiving the downstream wireless frames at the W-ONT 108 (block 412). In this example, the downstream RF signal is received at the W-ONT 108 and the wireless interface 302 in the W-ONT 108 extracts the downstream wireless frames from the received RF signal.

Method 400 further comprises providing the services implemented by the W-ONT 108 using the received downstream wireless frames (block 414). In this example, this is done as follows. The software 330 in the W-ONT 108 extracts the downstream optical frames from the wireless frames. The software 330 also extracts the downstream service data for each of the service interfaces 310 implemented by the W-ONT 108 and provides the downstream service data to the appropriates parts of the PON ONT chipset 312, which use the downstream service data to provide the associated service.

Figure 5:
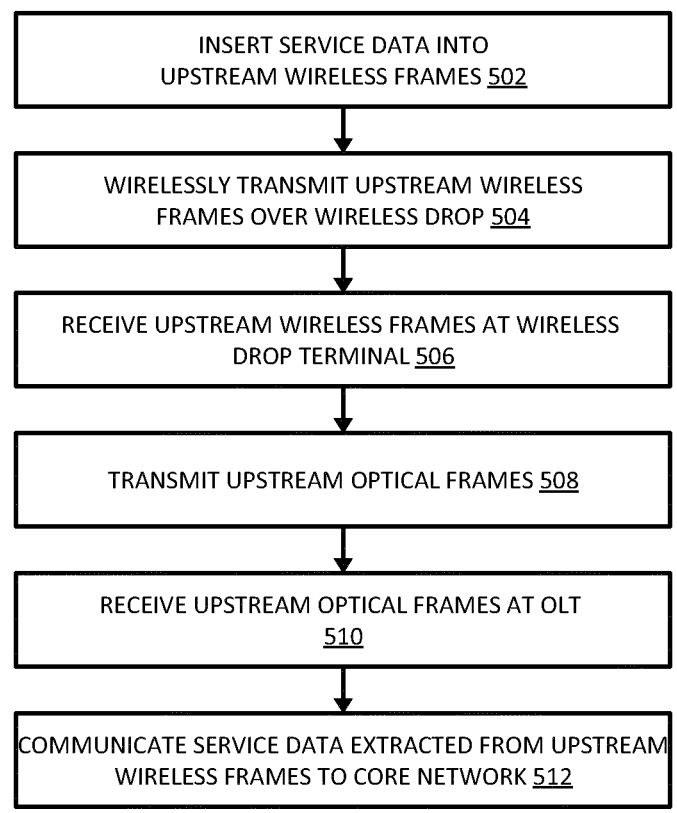
FIG. 5 is a flow diagram of one example of a method of communicating data from a customer home to an OLT using the FTTH network shown in FIG. 1.

FIG. 5 is a flow diagram of one example of a method 500 of communicating data from a customer home 110 to the OLT 104 using the FTTH network 100 shown in FIG. 1. Although the example method 500 shown in FIG. 5 is described here as being implemented in the FTTH network 100 of FIG. 1, it is to be understood that the method 500 can be implemented for use with other types of FTTH networks, and the FTTH network 100 shown in FIG. 1 can be used to communicate data in other ways.

Method 500 further comprises inserting the upstream service data into upstream wireless frames (block 502). In this example, this is done as follows. In the upstream direction, the software 330 in the W-ONT 108 receives upstream service data for each of the service interfaces 310 implemented by the W-ONT 108. The upstream service data is received from the appropriate parts of the PON ONT chipset 312 that implement each service. The software 330 combines the upstream service data and generates upstream optical frames that include the combined upstream service data. The upstream optical frames are generated in a format that is suitable for transmission on the fiber part of the FTTH network 100. The software 330 in the W-ONT 108 encapsulates the upstream optical frames (which include the upstream service data) in upstream wireless frames and forwards the upstream wireless frames to the wireless interface 302. As noted above, the service data can be inserted into wireless frames in other ways.

Method 500 further comprises wirelessly transmitting the upstream wireless frames from the W-ONT 108 to the wireless drop terminal 126 using the directional antenna 134 and the fixed, point-to-point wireless drop 102 (block 504). In this example, this is done as follows. The wireless interface 302 uses the cellular mobile unit physical layer chipset 304 to produce an upstream RF signal from upstream wireless frames. The upstream RF signal is radiated from the directional antenna 134 attached to the W-ONT 108.

Method 500 further comprises receiving the upstream wireless frames at the corresponding wireless drop terminal 126 (block 506). In this example, this is done as follows. The upstream RF signal transmitted from the W-ONT 108 is received at the corresponding wireless drop terminal 126 via the directional antenna 132. The wireless interface 206 in the wireless drop terminal 126 uses the femtocell cellular base station physical layer chipset 208 to extract the upstream wireless frames from the received upstream RF signal. The software 216 in the wireless drop terminal 126 extracts the upstream optical frames from the upstream wireless frames.

Method 500 further comprises transmitting upstream optical frames from the wireless drop terminal 126 to the corresponding OLT 104 using the fiber part of the FTTH network 100 (block 508). In this example, this is done as follows. The software 216 in the wireless drop terminal 126 extracts the upstream optical frames that were encapsulated into the upstream wireless frames. The software 216 in the wireless drop terminal forwards the extracted upstream optical frames to the fiber interface 202 in the wireless drop terminal 126.

The fiber interface 202 optically transmits the upstream optical frames on the F2 fiber 124 connected to wireless drop terminal 126. The upstream optical frames are optically transmitted using the particular optical physical layer protocol and technology implemented in the FTTH network 100 (for example, GPON, XGPON, and/or GIGABIT ETHERNET protocols and technology). In this example, a separate upstream optical signal is transmitted from each wireless drop terminal 126, each of which is transmitted using a different optical wavelength.

The upstream optical signal then travels from the wireless drop terminal 126 on the respective F2 fiber 124 through the F2 section 118 of the FTTH network 100. As noted above, the F2 fiber 124 over which the upstream optical signal travels is typically implemented using multiple different segments of optical fiber that are optically connected to one another. For example, as noted above, the F2 fibers 124 can be implemented using trunk cables and branch cables.

In this example, the upstream optical signal travels from the wireless drop terminal 126 to a passive optical network splitter 128. At the passive optical splitter 128, the upstream optical signal is received on one of the F2 fibers 124 connected to that splitter 128 and is output onto the F1 fiber 122 connected to that splitter 128. In this example, the upstream optical signal then travels from the passive optical splitter 128 to the OLT 104 assigned to that wireless drop terminal 126.

Method 500 further comprises receiving the upstream optical frames at the OLT 104 (block 510) and communicating upstream service data extracted from the upstream optical frames to the core network 112 of the service provider (block 512). In this example, the OLT 104 extracts the upstream optical frames from the upstream optical signal received at the OLT 104. The OLT 104 then extracts the management data and upstream service data and forwards the extracted management data and upstream service data to the management system and core network 112, respectively.

As noted above, although the preceding examples have been described above in connection with a particular passive optical network (PON) FTTH network, it is to be understood that the wireless drop techniques described here can be used with other types of FTTH networks. For example, in the example network 100 shown in FIG. 1, only a single passive splitter 128 is used in the optical path between the OLT 104 and the wireless drop terminal 126 for ease of explanation; it is to be understood, however, that multiple passive splitters can be used (for example, in the F1 section 116, the F2 section 118, and/or the F3 section 120).

Figure 6:
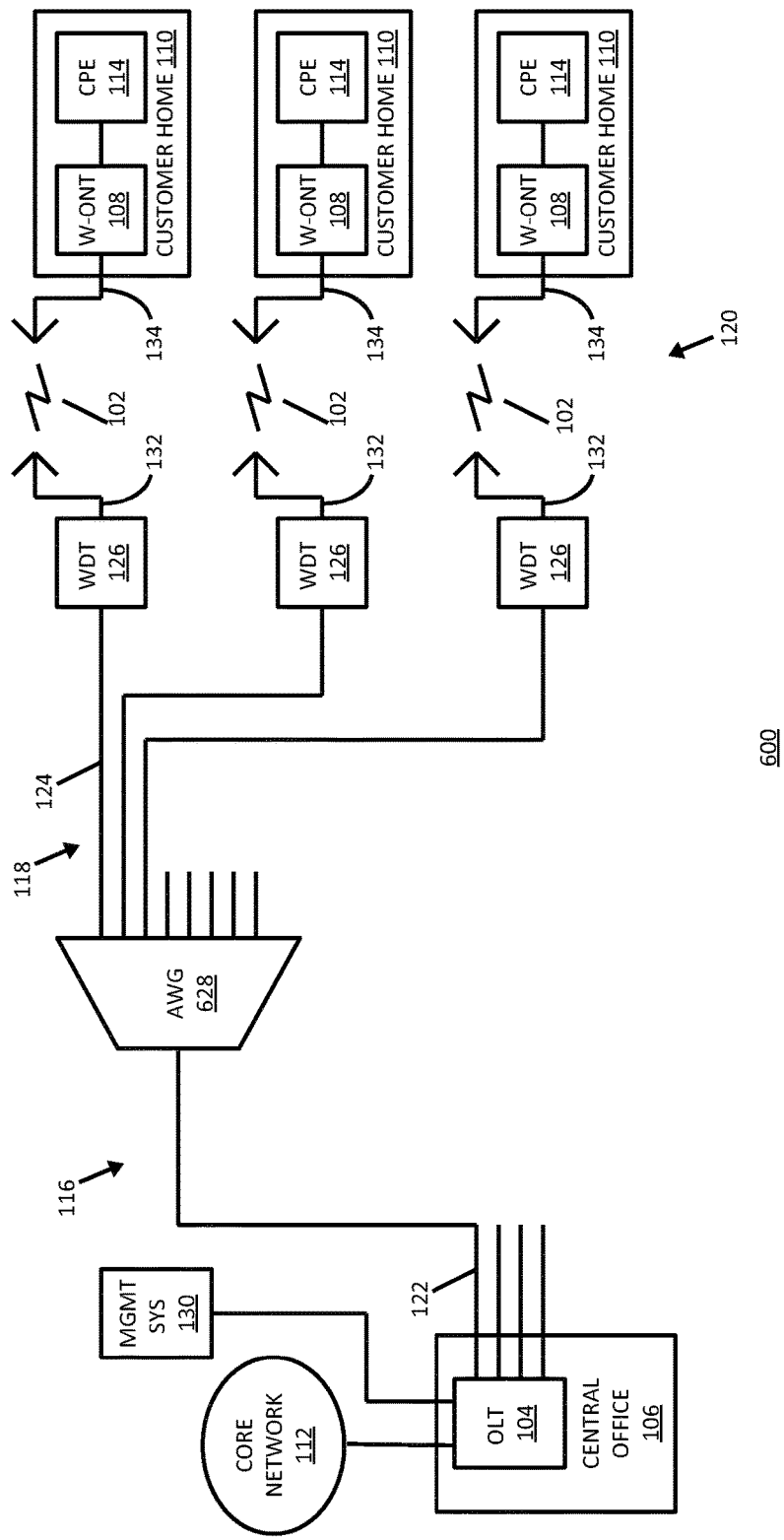
FIG. 6 is a block diagram of another example of an FTTH network that makes use of wireless drops.

FIG. 6 is a block diagram of another example of an FTTH network 600 that can be used with the wireless drop techniques described here. In the example FTTH network 600 shown in FIG. 6, the splitter 128 of FIG. 1 has been replaced with one or more arrayed waveguide gratings (AWG) 628 that are used to optically couple the F1 fibers 122 in the F1 section 116 to the F2 fibers 124 in the F2 section 118 of the network 600. In general, the wireless drops 102 shown in FIG. 6 are configured and operate as described above in connection with the example shown in FIG. 1. In this example, each WDT 126 sends and receives optical frames on a separate optical wavelength, and each AWG 628 acts as a wavelength-division multiplexer and de-multiplexer.

Figure 7:
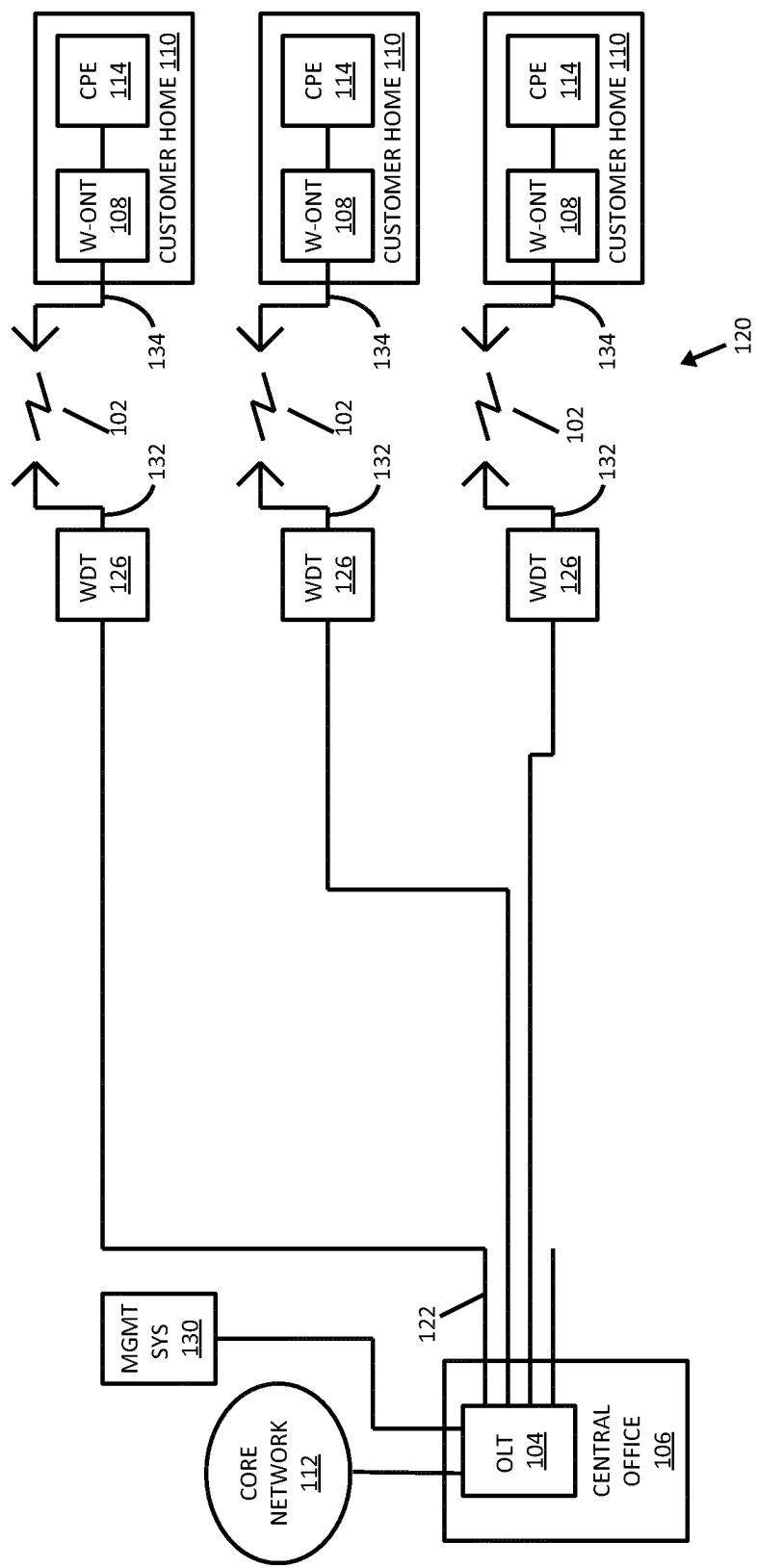
FIG. 7 is a block diagram of one example of an ETHERNET passive optical network (EPON) FTTH network that makes use of wireless drops.

Moreover, the wireless drop techniques described here can be used with ETHERNET PON (EPON) FTTH networks. FIG. 7 is a block diagram of one example of an EPON FTTH network 700 that can be used with the wireless drop techniques described here. In general, the wireless drops 102 shown in FIG. 7 are configured and operate as described above in connection with the example shown in FIG. 1.

Figure 8:
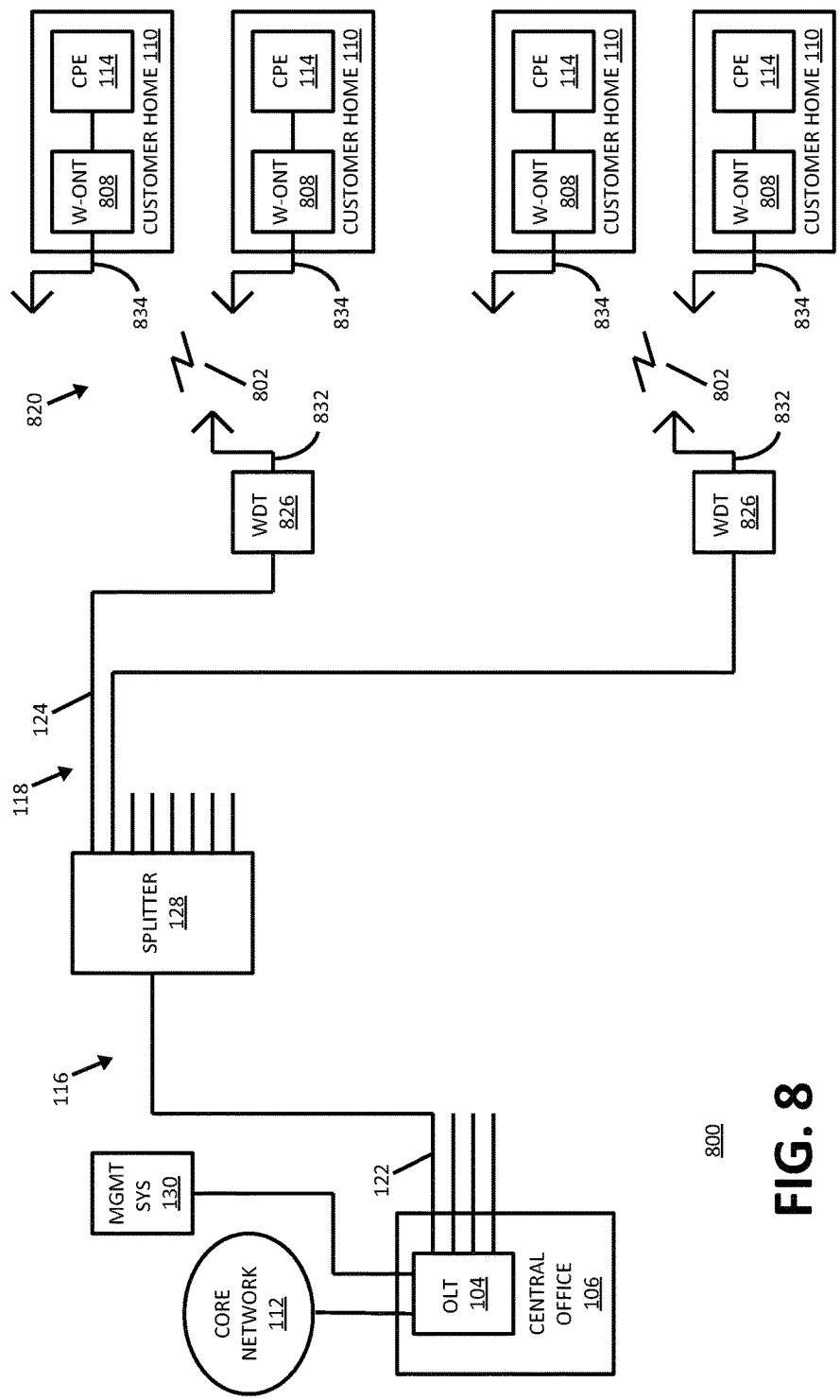
FIG. 8 is a block diagram of another example of an FTTH network that makes use of wireless drops.

Also, in the examples described above, each WDT 126 communicates with a single W-ONT 108 over a respective point-to-point wireless drop 102. However, in other examples, each WDT can communicate with more than one W-ONT (that is, the wireless drop can be implemented in a point-to-multipoint a manner). FIG. 8 is a block diagram of one example of such a FTTH network 800. In the example shown in FIG. 8, the drop section 820 of the network 800 is implemented so that each WDT 826 communicates with multiple W-ONTs 808 over a respective point-to-multipoint wireless drop 802. In this example, W-ONTs 808 (or at least the directional antennas 834 connected thereto) that communicate with a given WDT 826 and directional antennas 832 over a given wireless drop 802 are spaced sufficiently close together so as to be within the coverage area of the directional antenna 832.

Figure 9:
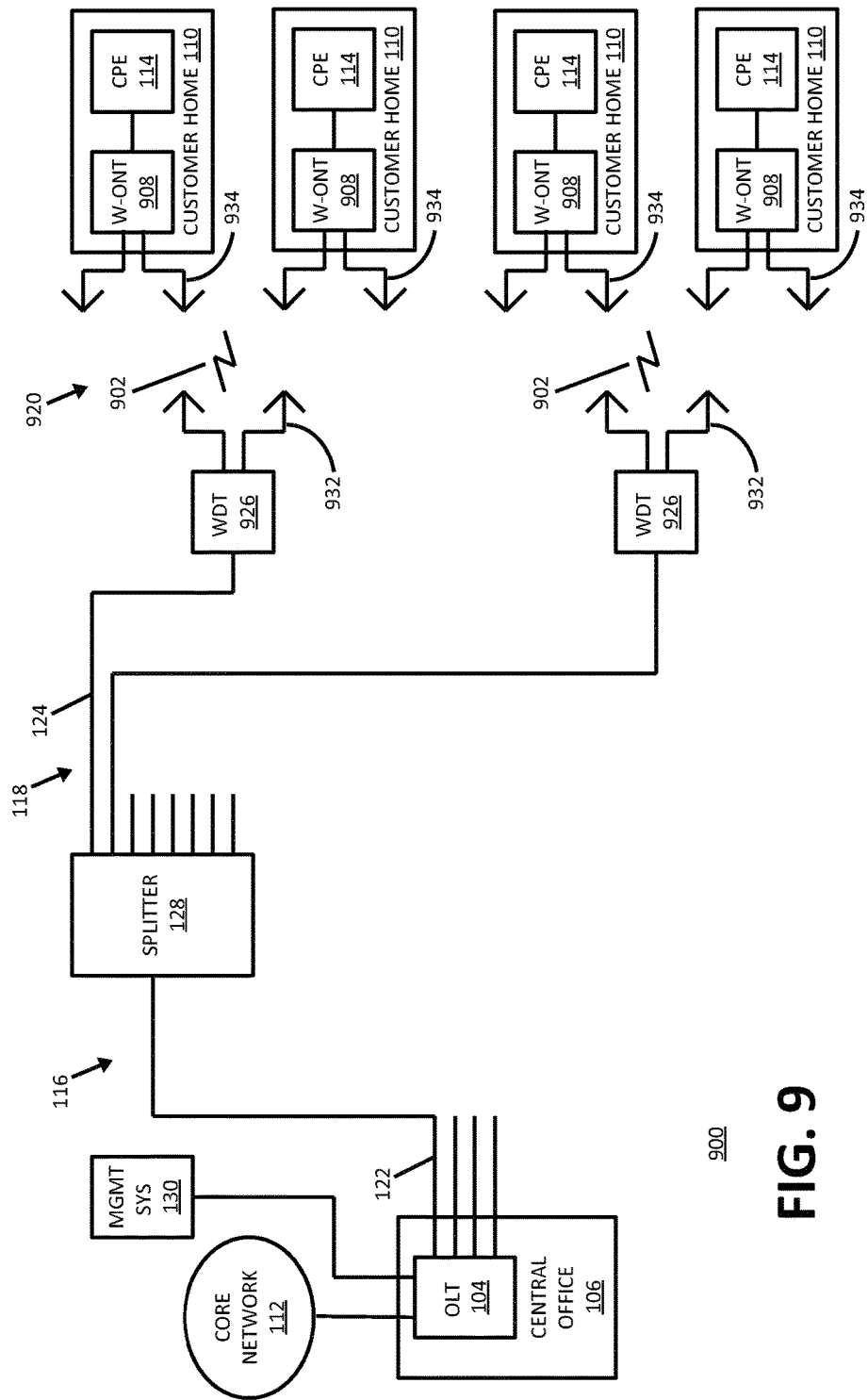
FIG. 9 is a block diagram of another example of an FTTH network that makes use of wireless drops.

Moreover, in the examples described above, each WDT 126 and each W-ONT 108 is shown as using only a single antenna 132 and 134 for communicating over the corresponding wireless drop 102. However, in other embodiments, the wireless drop terminals and/or W-ONTs use more than one antenna for communicating over the corresponding wireless drops. In such embodiments, MIMO and beam forming techniques can be used. FIG. 9 is a block diagram of one example of such a FTTH network 900. In the example shown in FIG. 9, the drop section 920 of the network 900 is implemented so that each wireless drop terminal 926 communicates with multiple W-ONTs 908 over a respective point-to-multipoint wireless drop 902 using multiple antennas 932. In this example, each W-ONT 908 uses multiple directional antennas 934 that communicate with a given WDT 926 and its associated directional antennas 932 over a given wireless drop 902 using MIMO technology (for example, using one or more WiMAX or other IEEE 802.16 standards or one or more WiFi or other IEEE 802.11 standards (such as the IEEE 802.11n or 802.11ac standards)). Also, it is to be understood that beam forming techniques can be used. In this example, each wireless drop 902 is directional because at least the wireless interface and antennas 934 of the corresponding W-ONT 908 are configured to communicate more effectively in the direction between that W-ONT 908 and the corresponding WDT 926. Also, if beam forming is used, beam forming can be used to implement such directionality.

One exemplary implementation of the embodiment shown in FIG. 9 is implemented using an IEEE 802.11n chipset, where the media access control (MAC) portion of the chipset implements standard IEEE 802.11n MAC protocols but where the physical layer (PHY) portion of the chipset deviates from the IEEE 802.11n protocols in that licensed radio frequency spectrum is used instead of unlicensed radio frequency spectrum (as is the case with standard IEEE 802.11n). In such an implementation, because licensed RF spectrum is used, it is possible to guarantee performance with a higher Equivalent Isotropically Radiated Power (EIRP) allowance and much less interference (than with using unlicensed RF spectrum).

The expected data rates (in megabits per second (Mbps)) for such an implementation transmitting at a frequency of 3.5 GigaHertz at distances in the range of 50 meters (m) to 300 meters with transmit powers in the range of 3 milliwatts (mW) to 24 milliwatts are shown in Table 1.

TABLE 1

| Transmit Power | 50 m | 100 m | 200 m | 300 m |
| --- | --- | --- | --- | --- |
| 8 mW | 100 Mbps | 65 Mbps | 30 Mbps | 18 Mbps |
| 16 mW | 120 Mbps | 80 Mbps | 45 Mbps | 30 Mbps |
| 65 mW | 160 Mbps | 120 Mbps | 82 Mbps | 60 Mbps |

Figure 10:
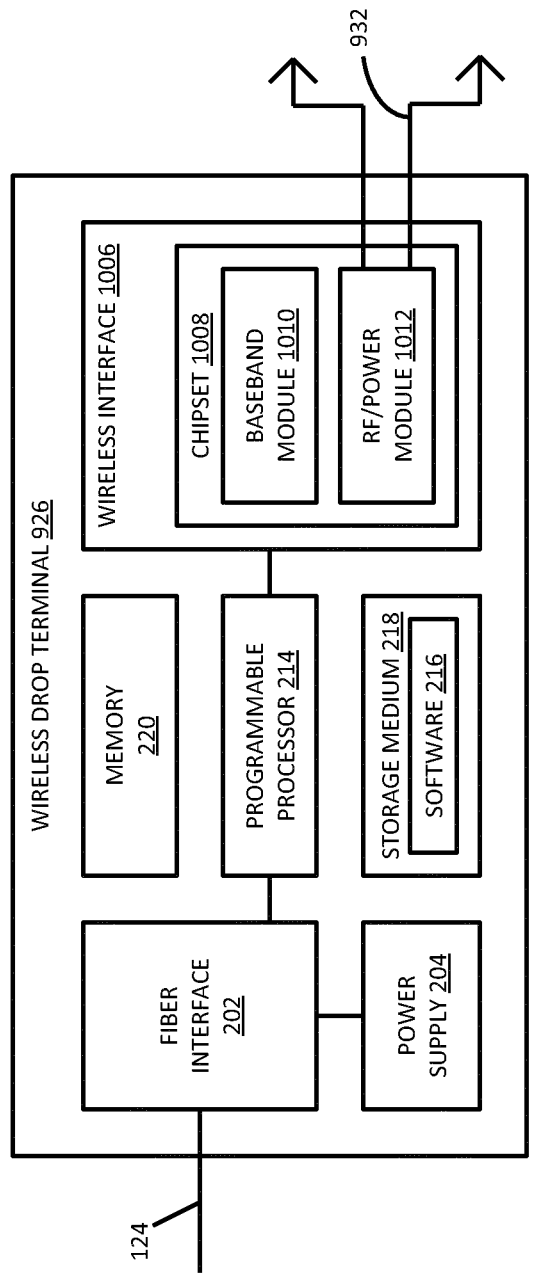
FIG. 10 is a block diagram of one example of a wireless drop terminal suitable for use in the FTTH network shown in FIG. 9.

FIG. 10 is a block diagram of one example of a wireless drop terminal suitable 926 for use in the FTTH network shown in FIG. 9. The elements of the exemplary embodiment shown in FIG. 10 that are similar to corresponding elements of the exemplary embodiment shown in FIG. 2 are referenced in FIG. 10 using the same reference numerals used in FIG. 2. Except as described below, the description of such similar elements set forth above in connection with the exemplary embodiment shown in FIG. 2 applies to the corresponding elements of the exemplary embodiment shown in FIG. 10 but generally will not be repeated in connection with FIG. 10 for the sake of brevity.

In the exemplary embodiment shown in FIG. 10, a single wireless interface 1006 is used to communicate with the corresponding W-ONTs 908 using the multiple antennas 932. In this example, the wireless interface 1006 is implemented using a chipset 1008 that implements the various wireless protocols that are used (including, for example, MIMO and, if used, beam forming protocols and techniques).

In one exemplary implementation of the example shown in FIG. 10, the chipset 1008 comprises a 3G or 4G femtocell cellular base station physical layer chipset that implements one or more 3G or 4G cellular physical layer protocols. In another exemplary implementation of the example shown in FIG. 10, the wireless interface 1006 is implemented using a wireless metropolitan area network or wireless local area network access point chipset that implements one or more WiMAX or other IEEE 802.16 standards or one or more WiFi or other IEEE 802.11 standards.

In this example, the chipset 1008 includes a baseband module 1010 that implements the baseband processing necessary to implement the particular protocols that are used (including baseband MIMO processing). In this example, the baseband module 1010 implements both transmit and receive baseband processing for the signals that are transmitted and received by all of the antennas 932 that are used by that wireless drop terminal 926. The baseband module 1010 can be implemented by programming a digital signal processor (DSP) to implement the baseband processing.

In the example shown in FIG. 10, the chipset 1008 also includes a RF/power module 1012 that performs the frequency conversion, filtering, and amplifying for the RF signals that are transmitted and received by all of the antennas 932 used by that wireless drop terminal 926. In one implementation where beam forming is used, at least a portion of the beam forming processing is performed in the RF/power module 1012 (for example, processing that controls the phase and relative amplitude of each signal that is transmitted from the antennas 932).

The chipset 1008 also includes other functionality (for example, media access control (MAC) functionality) (not shown).

It is to be understood, however, that each wireless drop terminal 926 shown in FIG. 9 can be implemented in other ways.

Figure 11:
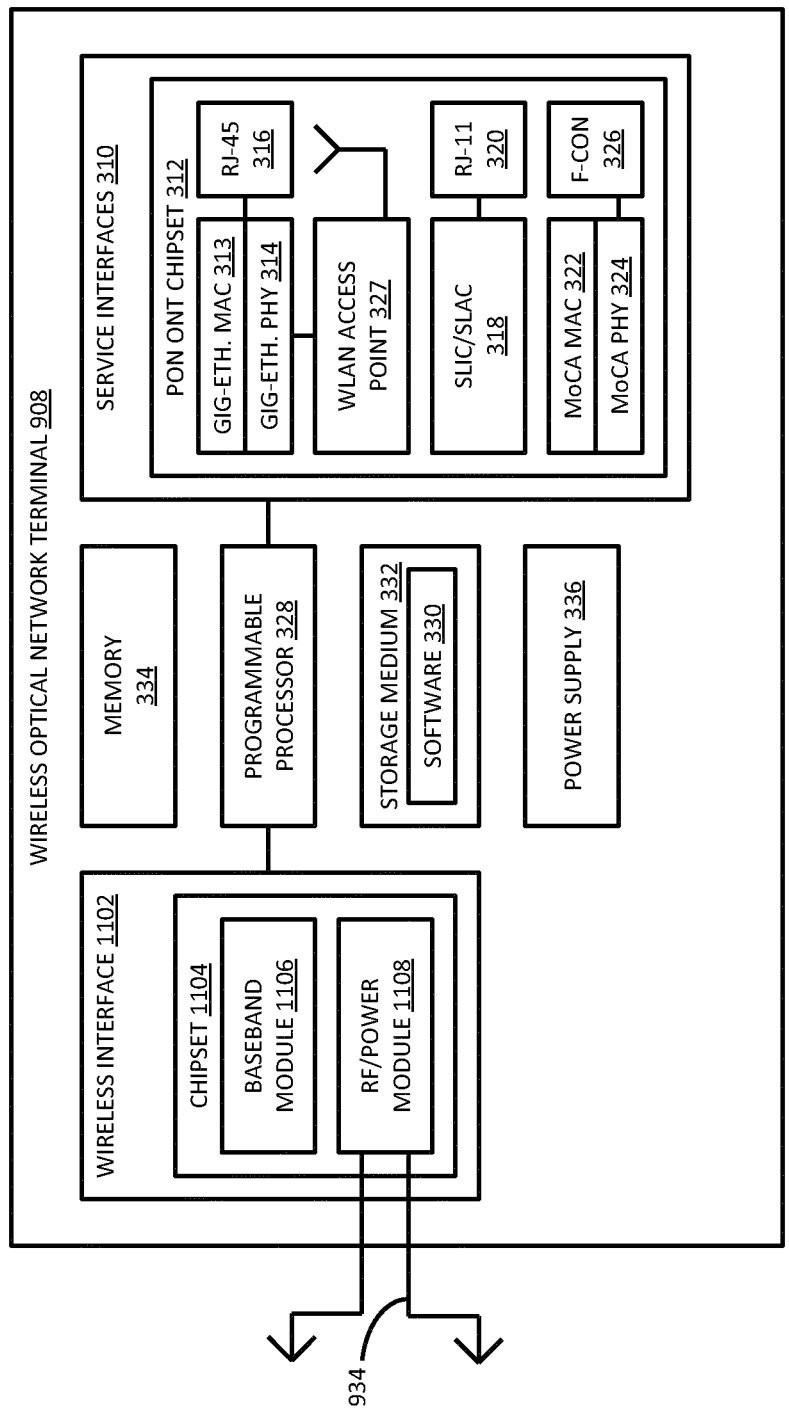
FIG. 11 is a block diagram of one example of a wireless optical network terminal (W-ONT) suitable for use in the FTTH network shown in FIG. 9.
Figure 12:
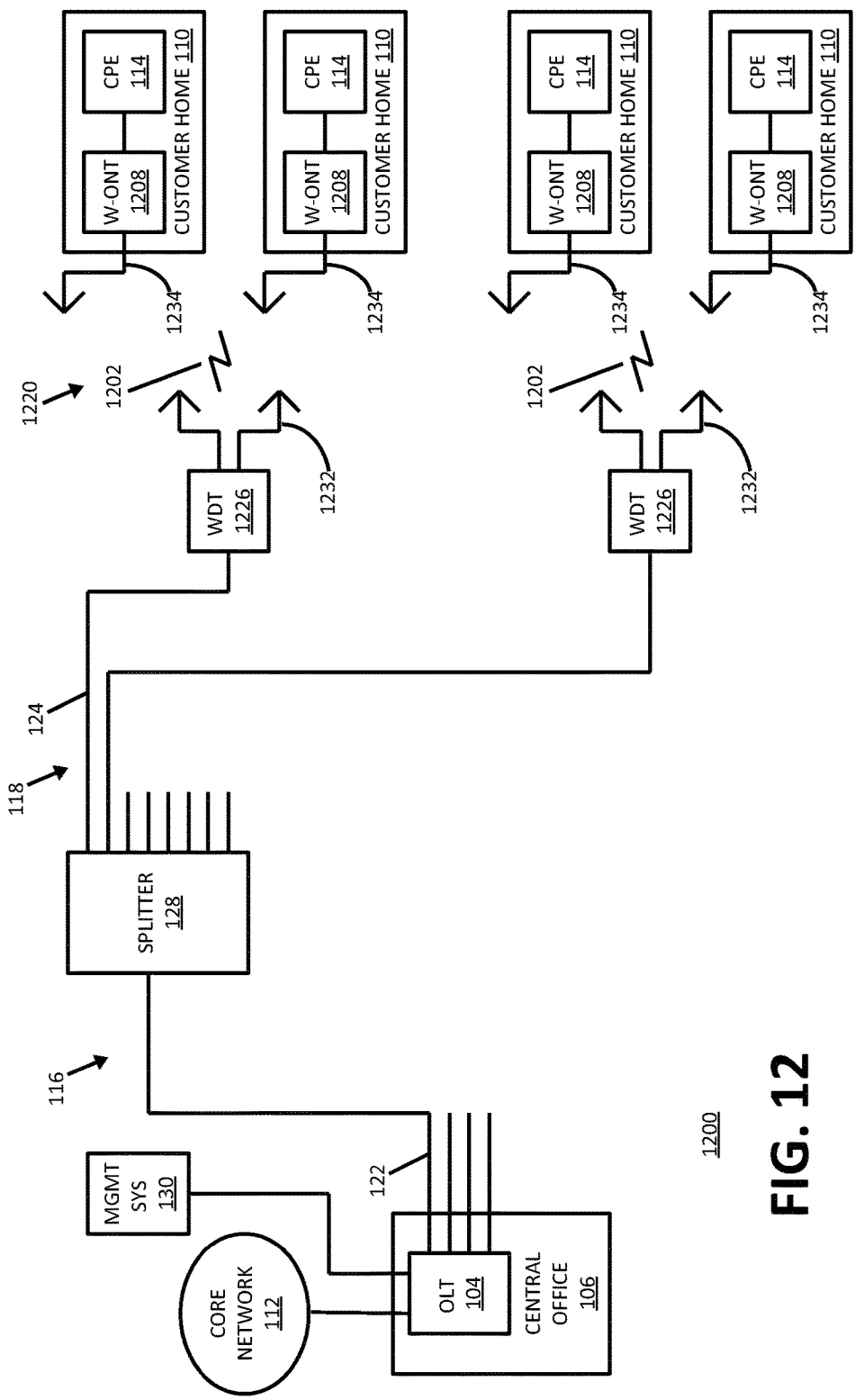
FIG. 12 is a block diagram of another example of an FTTH network that makes use of wireless drops.

FIG. 11 is a block diagram of one example of a wireless optical network terminal (W-ONT) 908 suitable for use in the FTTH network shown in FIG. 9. The elements of the exemplary embodiment shown in FIG. 11 that are similar to corresponding elements of the exemplary embodiment shown in FIG. 3 are referenced in FIG. 11 using the same reference numerals used in FIG. 3. Except as described below, the description of such similar elements set forth above in connection with the exemplary embodiment shown in FIG. 3 applies to the corresponding elements of the exemplary embodiment shown in FIG. 11 but generally will not be repeated in connection with FIG. 11 for the sake of brevity.

In this example, a single wireless interface 1102 is used to communicate with the corresponding WDT 926 using the multiple antennas 934 connected to that W-ONT 908.

In the exemplary embodiment shown in FIG. 11, the wireless interface 1102 is implemented using a chipset 1104 that implements the various wireless protocols that are used (including MIMO and, if used, beam forming protocols and techniques). Also, the wireless interface 1102 is compatible with the wireless interface 1006 used in the wireless drop terminal 126. In this example, the chipset 1104 includes a baseband module 1106 and an RF/power module 1108 that implement similar functionality as is implemented by the baseband module 1010 and the RF/power module 1012, respectfully, in the wireless drop terminal 1026 (including MIMO and, if used, beam forming protocols and techniques).

In one exemplary implementation of the example shown in FIG. 11, the wireless interface 1102 is implemented using a 3G or 4G cellular mobile unit chipset 1104 that implements one or more 3G or 4G cellular protocols. In another exemplary implementation of the example shown in FIG. 11, the wireless interface 1102 is implemented using a wireless metropolitan area network or wireless local area network physical layer end device chipset that implements one or more WiMAX or other IEEE 802.16 standards or one or more WiFi or other IEEE 802.11 standards protocols.

The chipset 1104 also includes other functionality (for example, media access control (MAC) functionality) (not shown).

It is to be understood, however, that each W-ONT 908 shown in FIG. 9 can be implemented in other ways.

As noted above, in the example shown in FIG. 9, each WDT 926 and each W-ONT 108 use multiple antennas 932 and 934 to communicate over the corresponding wireless drops 902. In the exemplary embodiment of a FTTH network 1200 shown in FIG. 12, the drop section 1220 of the network 1200 is implemented so that each WDT 1226 communicates with multiple W-ONTs 1208 over a respective point-to-multipoint wireless drop 1202 using multiple antennas 1232. However, in this example (unlike in the example shown in FIG. 9), each W-ONT 1208 uses a single directional antenna 1234 to communicate with the corresponding WDT 1226 and its associated directional antennas 1232 over a given wireless drop 1202.

In this example, beam forming is used at each WDT 1226 to, at least in part, implement the directionality of each fixed directional wireless drop 1202. Each WDT 1226 can be implemented in a similar manner as is shown in FIG. 10, and each W-ONT 1208 can be implemented in a similar manner as is shown in FIG. 3.

In the examples described above, relevant baseband processing is performed in each wireless drop terminal. However, such baseband processing can occur elsewhere in the network. For example, a radio-over-fiber (RoF) architecture can be used in which baseband processing does not occur in each WDT but instead occurs in a more centralized location (for example, in the central office). One such example is shown in FIG. 13.

Figure 13:
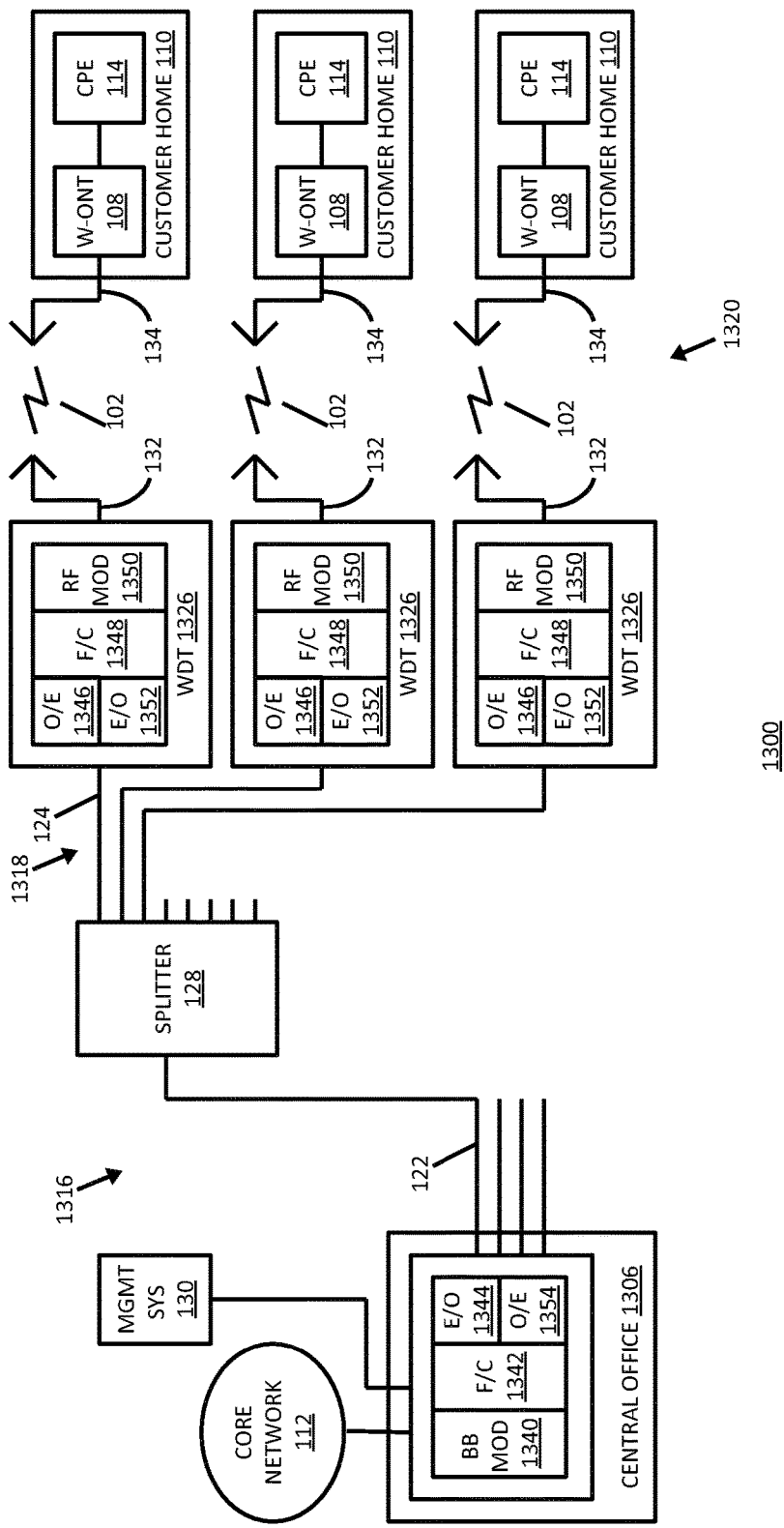
FIG. 13 is a block diagram of another example of an FTTH network that makes use of wireless drops and uses a radio-over-fiber (RoF) architecture.

In the exemplary embodiment of an FTTH network 1300 shown in FIG. 13, baseband processing is performed in the central office 1306 (for example, in a baseband module 1340). The elements of the exemplary embodiment shown in FIG. 13 that are similar to corresponding elements of the exemplary embodiment shown in FIG. 1 are referenced in FIG. 13 using the same reference numerals used in FIG. 1. Except as described below, the description of such similar elements set forth above in connection with the exemplary embodiment shown in FIG. 1 applies to the corresponding elements of the exemplary embodiment shown in FIG. 13 but generally will not be repeated in connection with FIG. 13 for the sake of brevity.

For each WDT 1326, the baseband module 1340 performs the baseband processing for the RF signals transmitted from and received by that WDT 1326 over a corresponding wireless drop 102.

For each WDT 1326, in the downstream direction, the baseband module 1340 receives downstream wireless frames to be transmitted to the W-ONT 108 serviced by that WDT 1326. The baseband module 1340 generates a baseband signal that can be used to produce a radio frequency (RF) signal by up converting it to the appropriate frequency range. However, in this example, the baseband signal is output by the baseband module 1340 and supplied as an input to a frequency converter 1342. The frequency converter 1342 converts the frequency of the baseband signal to a frequency suitable for communication over the fibers 122 and 124 in the network 1300. A suitable electrical-to-optical interface 1344 is used transmit the frequency-converted baseband signal on the fiber 122.

At each WDT 1326, the downstream optical signal (which includes the frequency-converted downstream baseband signal) is received and converted to an electrical signal by a suitable optical-to-electrical interface 1346. The electrical version of the received downstream frequency-converted baseband signal that is output by the OLE interface 1346 is supplied to a frequency converter 1348, which up converts the signal to the desired RF frequency. An RF module 1350 then filters and amplifies the RF signal as needed and then radiates the resulting downstream RF signal from the antenna 132.

In the upstream direction, each W-ONT 1308 receives an upstream RF signal, which is filtered by the RF module 1350 and the frequency converter 1348 converts the frequency of the signal to a frequency suitable for communication over the fibers 124 and 122 in the network 1300. A suitable electrical-to-optical interface 1352 is used to transmit the frequency-converted upstream signal on the fiber 124.

At the central office 1306, each upstream optical signal (which includes the frequency-converted upstream signal) is received and converted to an electrical signal by a suitable optical-to-electrical interface 1354. The electrical version of the received upstream frequency-converted signal output by the OLE interface 1354 is supplied to the frequency converter 1342, which converts the signal to baseband. The baseband module 1340 receives the upstream baseband signal output by the frequency converter 1342 and processes the received upstream baseband signal to extract upstream wireless frames.

In this way, each WDT 1326 need not perform baseband processing, which can be performed in a more centralized location in the network 1300.

A number of examples have been described. Nevertheless, it will be understood that various modifications to the described examples may be made without departing from the spirit and scope of the claimed invention. Accordingly, other examples and embodiments are within the scope of the following claims.

Example Embodiments

Example 1 includes a wireless drop terminal (WDT) for use in a fiber-to-the-home (FTTH) network, the wireless drop terminal comprising: a fiber interface to optically couple the wireless drop terminal to an optical line terminal (OLT) of the FTTH network via at least one optical fiber; and a wireless interface communicatively coupled to the fiber interface, wherein the wireless interface is configured to wirelessly communicate with a wireless optical network terminal (W-ONT) over a fixed directional wireless drop.

Example 2 includes the wireless drop terminal of Example 1, wherein a first antenna is connected to the wireless drop terminal; wherein the wireless drop terminal is configured to wirelessly communicate with the W-ONT over the fixed directional wireless drop using the first antenna; and wherein the first antenna comprises a first directional antenna.

Example 3 includes the wireless drop terminal of Example 2, wherein the wireless drop terminal is configured to wirelessly communicate with the W-ONT over the fixed directional wireless drop using the first antenna and a second antenna connected to the W-ONT; and wherein the second antenna comprises a second directional antenna.

Example 4 includes the wireless drop terminal of any of the Examples 1-3, wherein a first plurality of antennas are connected to the wireless drop terminal, wherein the fixed directional wireless drop is implemented using the first plurality of antennas.

Example 5 includes the wireless drop terminal of Example 4, wherein the first plurality of antennas is used to implement the fixed directional wireless drop using beam forming.

Example 6 includes the wireless drop terminal of any of the Examples 4-5, wherein a second plurality of antennas are connected to the W-ONT, wherein the fixed directional wireless drop is implemented using the first plurality of antennas and the second plurality of antennas using a Multiple-Input Multiple-Output (MIMO) wireless link.

Example 7 includes the wireless drop terminal of any of the Examples 1-6, wherein the fixed directional wireless drop comprises one of a fixed point-to-point wireless drop and a fixed point-to-multipoint wireless drop.

Example 8 includes the wireless drop terminal of any of the Examples 1-7, further comprising at least one of a femtocell chipset to wirelessly communicate with the W-ONT, a wireless local area network chipset to wirelessly communicate with the W-ONT; and a wireless metropolitan area network chipset to wirelessly communicate with the W-ONT.

Example 9 includes the wireless drop terminal of any of the Examples 1-8, wherein the FTTH network comprises a passive optical network (PON), wherein the wireless drop terminal is configured to communicate over the passive optical network.

Example 10 includes the wireless drop terminal of Example 9, wherein the wireless drop terminal is optically coupled, via at least one splitter, to an optical line terminal (OLT) included in the FTTH network to couple the FTTH network to a core network.

Example 11 includes the wireless drop terminal of any of the Examples 1-10, wherein the wireless drop terminal is configured to be powered by power provided over a hybrid fiber cable that is connected to the wireless drop terminal.

Example 12 includes the wireless drop terminal of any of the Examples 1-11, wherein the wireless drop terminal is configured to be powered by at least one of power provided from a connection to a mains alternating current (AC) power grid, power provided from a battery, power provided from a separate power cable connected to a fiber distribution hub, power provided from a lamp or utility pole on which the wireless-drop terminal is installed, and power provided using solar power.

Example 13 includes the wireless drop terminal of any of the Examples 1-12, wherein the wireless drop terminal is configured to wirelessly communicate with the W-ONT using at least one of: a 3G communication protocol, a 4G communication protocol, a High Speed Packet Access (HSPA) cellular protocol, an Evolved HSPA (HSPA+) cellular protocol, a Long Term Evolution (LTE) cellular protocol, a LTE Advanced (LTEadvanced) cellular protocol, a WIMAX or other Institute of Electrical and Electronics Engineers (IEEE) 802.16 wireless protocol, a WIFI or other IEEE 802.11 wireless protocol, Multiple-Input, Multiple-Output (MIMO) technology, beam forming, WirelessHD wireless technology, Wireless Home Digital Interface (WHDI) wireless technology, ultra wideband (UWB) wireless technology, visible light communication wireless technology, and proprietary point-to-point wireless technology.

Example 14 includes the wireless drop terminal of any of the Examples 1-13, wherein the wireless drop terminal is configured to wirelessly communicate with the W-ONT using a WIFI or other IEEE 802.11 wireless protocol using licensed radio frequency spectrum.

Example 15 includes the wireless drop terminal of any of the Examples 1-14, wherein the wireless drop terminal is configured to receive downstream optical frames at the wireless drop terminal, insert service data from the downstream optical frames into downstream wireless frames, and wirelessly transmit the downstream wireless frames to the W-ONT; wherein the W-ONT is configured to receive the downstream wireless frames and provide at least one service using the received downstream wireless frames; wherein the W-ONT is configured to insert upstream service data into upstream wireless frames and wirelessly transmit the upstream wireless frames to the wireless drop terminal; and wherein the wireless drop terminal is configured to receive the upstream wireless frames and transmit upstream optical frames to the optical line terminal of the FTTH network, wherein the upstream optical frames include the upstream service data inserted into the upstream wireless frames.

Example 16 includes the wireless drop terminal of any of the Examples 1-15, wherein the FTTH network comprises a radio-over-fiber (RoF) architecture and the wireless drop terminal is configured to communicate over the RoF architecture.

Example 17 includes a wireless optical network terminal (W-ONT) for use in a fiber-to-the-home (FTTH) network, the W-ONT comprising: a wireless interface; and at least one service interface to implement a service provided to customer premises equipment (CPE); wherein the wireless interface is configured to wirelessly communicate with a wireless drop terminal (WDT) included in the FTTH network over a fixed directional wireless drop.

Example 18 includes the W-ONT of Example 17, wherein the wireless interface is implemented using at least one of a cellular mobile unit chipset, a wireless local area network chipset, and a wireless metropolitan area network chipset.

Example 19 includes the W-ONT of any of the Examples 17-18, wherein the service interface comprises at least one of an ETHERNET service interface, a POTS telephony service interface, a wireless local area network service interface, and a video service interface.

Example 20 includes the W-ONT of Example 19, wherein the ETHERNET service interface comprises a Gigabit ETHERNET service interface.

Example 21 includes the W-ONT of any of the Examples 17-20, wherein the service interface is implemented using at least a portion of a conventional optical network terminal chipset.

Example 22 includes a fiber-to-the-home (FTTH) network comprising: an optical line terminal (OLT) to couple the FTTH network to a core network; a wireless drop terminal (WDT) that is optically coupled to the OLT via at least one optical fiber; and a wireless optical network terminal (W-ONT) to provide a service to customer premises equipment (CPE); and wherein the wireless drop terminal and the W-ONT are configured to wirelessly communicate with one another over a fixed directional wireless drop.

Example 23 includes the FTTH network of Example 22, wherein the FTTH network comprises at least one of a Gigabit-capable Passive Optical Network (GPON), a Ten-Gigabit-capable Passive Optical Network (XGPON), and an ETHERNET Passive Optical Network (EPON).

Example 24 includes the FTTH network of any of the Examples 22-23, wherein the FTTH network comprises a radio-over-fiber (RoF) architecture.

Example 25 includes a method of communicating using a fiber-to-the-home (FTTH) network, the method comprising: transmitting downstream optical frames from an optical line terminal (OLT) in the FTTH network to a wireless drop terminal (WDT) in the FTTH network using a fiber part of the FTTH network; receiving the downstream optical frames at the wireless drop terminal from the fiber part of the FTTH network; inserting service data from the downstream optical frames into downstream wireless frames; wirelessly transmitting the downstream wireless frames from the wireless drop terminal to a wireless optical network terminal (W-ONT) over a fixed directional wireless drop; receiving the downstream wireless frames at the wireless optical network terminal; and providing at least one service implemented by the wireless optical network terminal using the received downstream wireless frames.

Example 26 includes the method of Example 25, further comprising: inserting upstream service data into upstream wireless frames; wirelessly transmitting the upstream wireless frames from the wireless optical network terminal to the wireless drop terminal over the fixed directional wireless drop; receiving the upstream wireless frames at the wireless drop terminal; transmitting upstream optical frames from the wireless drop terminal to the optical line terminal using the fiber part of the FTTH network, wherein the upstream optical frames include the upstream service data inserted into the upstream wireless frames; receiving the upstream optical frames at the optical line terminal; and communicating the upstream service data extracted from the upstream optical frames to a core network.

PARTS LIST fiber-to-the-home (FTTH) network 100
wireless drop 102
optical line terminal (OLT) 104
central office 106
wireless optical network terminal (W-ONT) 108
customer home 110
service provider core network 112
customer premises equipment (CPE) 114
feeder section/F1 section 116
distribution section/F2 section 118
drop section/F3 section 120
feeder optical fiber/F1 fiber 122
distribution optical fiber/F2 fiber 124
wireless drop terminal (WDT) 126
passive optical splitter 128
management system 130
directional antenna 132
directional antenna 134
fiber interface 202 power supply 204
wireless interface 206
chipset 208
baseband module 210
RF/power module 212
programmable processor 214
software 216
storage media 218
memory 220
wireless interface 302
chipset 304
baseband module 306
RF/power module 308
service interfaces 310
passive optical network (PON) optical network terminal (ONT) chipset 312
GIGABIT ETHERNET media access control (MAC) device 313
physical layer device 314
RJ-45 jacks 316
subscriber line interface circuit (SLIC)/subscriber line audio processing circuit (SLAC) device 318
RJ-11 jacks 320
Multimedia over Coax Alliance (MoCA) MAC device 322
Multimedia over Coax Alliance (MoCA) physical layer device 324
F connectors 326
wireless local area network access point 327
programmable processor 328
software 330
storage media 332
memory 334
power supply 336
method 400
method 500
fiber-to-the-home (FTTH) network 600
arrayed waveguide gratings (AWG) 628
ETHERNET PON (EPON) fiber-to-the-home (FTTH) network 700
fiber-to-the-home (FTTH) network 800
point-to-multipoint wireless drop 802
wireless optical network terminal (W-ONT) 808
drop section/F3 section 820
wireless drop terminal (WDT) 826
directional antenna 832
directional antenna 834
fiber-to-the-home (FTTH) network 900
point-to-multipoint wireless drop 902
wireless optical network terminal (W-ONT) 908
drop section/F3 section 920
wireless drop terminal (WDT) 926
multiple antennas 932
multiple directional antennas 934
wireless interface 1006
chipset 1008
baseband module 1010
RF/power module 1012
wireless interface 1102
chipset 1104
baseband module 1106
RF/power module 1108
fiber-to-the-home (FTTH) network 1200
point-to-multipoint wireless drop 1202
wireless optical network terminal (W-ONT) 1208
drop section/F3 section 1220
wireless drop terminal (WDT) 1226
multiple antennas 1232
directional antenna 1234
fiber-to-the-home (FTTH) network 1300
central office 1306
feeder section/F1 section 1316
distribution section/F2 section 1318
drop section/F3 section 1320
wireless drop terminal (WDT) 1326
baseband module 1340
frequency converter 1342
electrical-to-optical (E/O) interface 1344
optical-to-electrical (O/E) interface 1346
frequency converter 1348
RF module 1350
electrical-to-optical (E/O) interface 1352
optical-to-electrical (O/E) interface 1354

What is claimed:

1. A wireless drop terminal for use in a fiber-to-the-home (FTTH) network, the wireless drop terminal comprising:
   a fiber interface to optically couple the wireless drop terminal to an optical line terminal of the FTTH network via at least one optical fiber; and
   a wireless interface communicatively coupled to the fiber interface, wherein the wireless interface is configured to wirelessly communicate RF signals over a fixed directional wireless drop with a wireless optical network terminal (W-ONT) through a first directional antenna connected to the wireless drop terminal and a second directional antenna connected to the W-ONT, wherein the W-ONT is located at a customer premises, wherein the wireless drop terminal and the first directional antenna are located outside of the customer premises;
   wherein the W-ONT comprises an optical network terminal (ONT) chipset, wherein the W-ONT converts downstream wireless frames received from the fixed directional wireless drop into an electrical signal comprising downstream optical frames and inputs the downstream optical frames to the ONT chipset.

2. The wireless drop terminal of claim 1, wherein a first antenna is connected to the wireless drop terminal;
   wherein the wireless drop terminal is configured to wirelessly communicate with the W-ONT over the fixed directional wireless drop using the first antenna; and
   wherein the first antenna comprises a first directional antenna.

3. The wireless drop terminal of claim 2, wherein the wireless drop terminal is configured to wirelessly communicate with the W-ONT over the fixed directional wireless drop using the first antenna and a second antenna connected to the W-ONT; and
   wherein the second antenna comprises a second directional antenna.

4. The wireless drop terminal of claim 1, wherein a first plurality of antennas are connected to the wireless drop terminal, wherein the fixed directional wireless drop is implemented using the first plurality of antennas.

5. The wireless drop terminal of claim 4, wherein the first plurality of antennas is used to implement the fixed directional wireless drop using beam forming.

6. The wireless drop terminal of claim 4, wherein a second plurality of antennas are connected to the W-ONT, wherein the fixed directional wireless drop is implemented using the first plurality of antennas and the second plurality of antennas using a Multiple-Input Multiple-Output (MIMO) wireless link.

7. The wireless drop terminal of claim 1, wherein the fixed directional wireless drop comprises one of a fixed point-to-point wireless drop and a fixed point-to-multipoint wireless drop.

8. The wireless drop terminal of claim 1, further comprising at least one of a femtocell chipset to wirelessly communicate with the W-ONT, a wireless local area network chipset to wirelessly communicate with the W-ONT; and a wireless metropolitan area network chipset to wirelessly communicate with the W-ONT.

9. The wireless drop terminal of claim 1, wherein the FTTH network comprises a passive optical network, wherein the wireless drop terminal is configured to communicate over the passive optical network.

10. The wireless drop terminal of claim 9, wherein the wireless drop terminal is optically coupled, via at least one splitter, to an optical line terminal (OLT) included in the FTTH network to couple the FTTH network to a core network.

11. The wireless drop terminal of claim 1, wherein the wireless drop terminal is configured to be powered by power provided over a hybrid fiber cable that is connected to the wireless drop terminal.

12. The wireless drop terminal of claim 1, wherein the wireless drop terminal is configured to be powered by at least one of power provided from a connection to a mains alternating current (AC) power grid, power provided from a battery, power provided from a separate power cable connected to a fiber distribution hub, power provided from a lamp or utility pole on which the wireless-drop terminal is installed, and power provided using solar power.

13. The wireless drop terminal of claim 1, wherein the wireless drop terminal is configured to wirelessly communicate with the W-ONT using at least one of: a 3G communication protocol, a 4G communication protocol, a High Speed Packet Access (HSPA) cellular protocol, an Evolved HSPA (HSPA+) cellular protocol, a Long Term Evolution (LTE) cellular protocol, a LTE Advanced (LTEadvanced) cellular protocol, a WIMAX or other Institute of Electrical and Electronics Engineers (IEEE) 802.16 wireless protocol, a WIFI or other IEEE 802.11 wireless protocol, Multiple-Input, Multiple-Output (MIMO) technology, beam forming, WirelessHD wireless technology, Wireless Home Digital Interface (WHDI) wireless technology, ultra wideband (UWB) wireless technology, visible light communication wireless technology, and proprietary point-to-point wireless technology.

14. The wireless drop terminal of claim 1, wherein the wireless drop terminal is configured to wirelessly communicate with the W-ONT using a WIFI or other IEEE 802.11 wireless protocol using licensed radio frequency spectrum.

15. The wireless drop terminal of claim 1, wherein the wireless drop terminal is configured to encapsulate downstream optical frames of data received at the wireless data terminal, wherein the downstream optical frames are encapsulated in downstream wireless frames that are wirelessly transmitted to the W-ONT;
wherein the W-ONT is configured to extract the downstream optical frames from the downstream wireless frames wirelessly received from the wireless drop terminal;
wherein the W-ONT comprises an optical network terminal chipset configured to extract downstream service data from the extracted downstream optical frames for use by a service interface included in the W-ONT in providing a service to a customer of the FTTH network;
wherein the W-ONT is configured to generate upstream optical frames formatted for communication on a fiber part of the FTTH network, wherein the upstream optical frames include upstream service data received from the service interface;
wherein the W-ONT is configured to encapsulate the upstream optical frames in upstream wireless frames, wherein the upstream wireless frames are wirelessly communicated by the W-ONT to the wireless drop terminal;
wherein the wireless drop terminal is configured to extract the upstream optical frames from the upstream wireless frames wirelessly received from the W-ONT.

16. The wireless drop terminal of claim 1, wherein the FTTH network comprises a radio-over-fiber (RoF) architecture and the wireless drop terminal is configured to communicate over the RoF architecture.

17. A wireless optical network terminal (W-ONT) for use in a fiber-to-the-home (FTTH) network, the W-ONT comprising:
a wireless interface; and
at least one service interface to implement a service provided to a customer of the FTTH network;
wherein the wireless interface is configured to wirelessly communicate RF signals with a wireless drop terminal included in the FTTH network over a fixed directional wireless drop through a first directional antenna connected to the wireless drop terminal and a second directional antenna connected to the W-ONT, wherein the W-ONT is located at a customer premises and the wireless drop terminal and the first directional antenna are located outside of the customer premises;
wherein the W-ONT comprises an optical network terminal (ONT) chipset, wherein the W-ONT converts downstream wireless frames received from the fixed directional wireless drop into an electrical signal comprising downstream optical frames and inputs the downstream optical frames to the ONT chipset.

18. The W-ONT of claim 17, wherein the wireless interface is implemented using at least one of a cellular mobile unit chipset, a wireless local area network chipset, and a wireless metropolitan area network chipset.

19. The W-ONT of claim 17, wherein the service interface comprises at least one of an ETHERNET service interface, a POTS telephony service interface, a wireless local area network service interface, and a video service interface.

20. The W-ONT of claim 19, wherein the ETHERNET service interface comprises a Gigabit ETHERNET service interface.

21. The W-ONT of claim 17, wherein the service interface is implemented using at least a portion of a conventional optical network terminal chipset.

22. A fiber-to-the-home (FTTH) network comprising:
an optical line terminal (OLT) to couple the FTTH network to a core network;
a wireless drop terminal that is optically coupled to the OLT via at least one optical fiber and electrically coupled to a first directional antenna; and
a wireless optical network terminal (W-ONT) coupled to a second directional antenna, the W-ONT located at a customer premises to provide a service to customer premises equipment, wherein the wireless drop terminal and the first directional antenna are outside the customer premises; and
wherein the wireless drop terminal and the W-ONT are configured to wirelessly communicate the RF signals with one another over a fixed directional wireless drop using the first and second directional antennas;

wherein the W-ONT comprises an optical network terminal (ONT) chipset, wherein the W-ONT converts downstream wireless frames received from the fixed directional wireless drop into an electrical signal comprising downstream optical frames and inputs the downstream optical frames to the ONT chipset.

23. The FTTH network of claim 22, wherein the FTTH network comprises at least one of a Gigabit-capable Passive Optical Network (GPON), a Ten-Gigabit-capable Passive Optical Network (XGPON), and an ETHERNET Passive Optical Network (EPON).

24. The FTTH network of claim 22, wherein the FTTH network comprises a radio-over-fiber (RoF) architecture.

25. A method of communicating using a fiber-to-the-home (FTTH) network, the method comprising:

transmitting downstream optical frames from an optical line terminal in the FTTH network to a wireless drop terminal in the FTTH network using a fiber part of the FTTH network;

receiving the downstream optical frames at the wireless drop terminal from the fiber part of the FTTH network;

inserting service data from the downstream optical frames into downstream wireless frames;

wirelessly transmitting the downstream wireless frames as an RF signal from the wireless drop terminal to a wireless optical network terminal through a first directional antenna over a fixed directional wireless drop;

receiving the downstream wireless frames in the RF signal at the wireless optical network terminal at a customer premises through a second directional antenna, wherein the wireless drop terminal is located outside of the customer premises;

generating an electrical signal comprising downstream optical frames at the wireless optical network terminal from the downstream wireless frames and inputting the downstream optical frames into an optical network terminal (ONT) chipset; and providing at least one service implemented by the wireless optical network terminal using the received downstream wireless frames.

26. The method of claim 25, further comprising:

inserting upstream service data into upstream wireless frames;

wirelessly transmitting the upstream wireless frames from the wireless optical network terminal to the wireless drop terminal over the fixed directional wireless drop;

receiving the upstream wireless frames at the wireless drop terminal;

transmitting upstream optical frames from the wireless drop terminal to the optical line terminal using the fiber part of the FTTH network, wherein the upstream optical frames include the upstream service data inserted into the upstream wireless frames;

receiving the upstream optical frames at the optical line terminal; and communicating the upstream service data extracted from the upstream optical frames to a core network.

* * * * *